(12) United States Patent
Wang et al.

(10) Patent No.: US 10,354,399 B2
(45) Date of Patent: Jul. 16, 2019

(54) MULTI-VIEW BACK-PROJECTION TO A LIGHT-FIELD

(71) Applicant: GOOGLE LLC, Mountain View, CA (US)

(72) Inventors: Zejing Wang, Mountain View, CA (US); Thomas Nonn, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 31 days.

(21) Appl. No.: 15/605,037

(22) Filed: May 25, 2017

(65) Prior Publication Data

US 2018/0342075 A1 Nov. 29, 2018

(51) Int. Cl.
*G06T 7/557* (2017.01)
*H04N 13/218* (2018.01)
*H04N 13/00* (2018.01)

(52) U.S. Cl.
CPC .......... *G06T 7/557* (2017.01); *H04N 13/218* (2018.05); *G06T 2207/10052* (2013.01); *H04N 2013/0081* (2013.01)

(58) Field of Classification Search
None
See application file for complete search history.

(56) References Cited

U.S. PATENT DOCUMENTS

| | | |
|---|---|---|
| 725,567 A | 4/1903 | Ives |
| 4,383,170 A | 5/1983 | Takagi et al. |
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,157,465 A | 10/1992 | Kronberg |
| 5,251,019 A | 10/1993 | Moorman et al. |
| 5,282,045 A | 1/1994 | Mimura et al. |
| 5,499,069 A | 3/1996 | Griffith |

(Continued)

FOREIGN PATENT DOCUMENTS

| | | |
|---|---|---|
| CN | 101226292 | 7/2008 |
| CN | 101309359 | 11/2008 |

(Continued)

OTHER PUBLICATIONS

Haeberli, "A Multifocus Method for Controlling Depth of Field" Graphica Obscura, 1994, pp. 1-3.

(Continued)

*Primary Examiner* — Reza Aghevli

(57) ABSTRACT

Dense light-field data can be generated from image data that does not include light-field data, or from image data that includes sparse light-field data. In at least one embodiment, the source light-field data may include one or more sub-aperture images that may be used to reconstruct the light-field in denser form. In other embodiments, the source data can take other forms. Examples include data derived from or ancillary to a set of sub-aperture images, synthetic data, or captured image data that does not include full light-field data. Interpolation, back-projection, and/or other techniques are used in connection with source sub-aperture images or their equivalents, to generate dense light-field data.

29 Claims, 17 Drawing Sheets

(56) References Cited

U.S. PATENT DOCUMENTS

| | | | |
|---|---|---|---|
| 5,572,034 A | 11/1996 | Karellas | |
| 5,610,390 A | 3/1997 | Miyano | |
| 5,729,471 A | 3/1998 | Jain et al. | |
| 5,748,371 A | 5/1998 | Cathey, Jr. et al. | |
| 5,757,423 A | 5/1998 | Tanaka et al. | |
| 5,818,525 A | 10/1998 | Elabd | |
| 5,835,267 A | 11/1998 | Mason et al. | |
| 5,907,619 A | 5/1999 | Davis | |
| 5,949,433 A | 9/1999 | Klotz | |
| 5,974,215 A | 10/1999 | Bilbro et al. | |
| 6,005,936 A | 12/1999 | Shimizu et al. | |
| 6,021,241 A | 2/2000 | Bilbro et al. | |
| 6,023,523 A | 2/2000 | Cohen et al. | |
| 6,028,606 A | 2/2000 | Kolb et al. | |
| 6,034,690 A | 3/2000 | Gallery et al. | |
| 6,061,083 A | 5/2000 | Aritake et al. | |
| 6,061,400 A | 5/2000 | Pearlstein et al. | |
| 6,069,565 A | 5/2000 | Stern et al. | |
| 6,075,889 A | 6/2000 | Hamilton, Jr. et al. | |
| 6,084,979 A | 7/2000 | Kanade et al. | |
| 6,091,860 A | 7/2000 | Dimitri | |
| 6,097,394 A | 8/2000 | Levoy et al. | |
| 6,115,556 A | 9/2000 | Reddington | |
| 6,137,100 A | 10/2000 | Fossum et al. | |
| 6,169,285 B1 | 1/2001 | Pertrillo et al. | |
| 6,201,899 B1 | 3/2001 | Bergen | |
| 6,221,687 B1 | 4/2001 | Abramovich | |
| 6,320,979 B1 | 11/2001 | Melen | |
| 6,424,351 B1 | 7/2002 | Bishop et al. | |
| 6,448,544 B1 | 9/2002 | Stanton et al. | |
| 6,466,207 B1 | 10/2002 | Gortler et al. | |
| 6,476,805 B1 | 11/2002 | Shum et al. | |
| 6,479,827 B1 | 11/2002 | Hamamoto et al. | |
| 6,483,535 B1 | 11/2002 | Tamburrino et al. | |
| 6,529,265 B1 | 3/2003 | Henningsen | |
| 6,573,912 B1 * | 6/2003 | Suzuki | G06T 17/10 715/757 |
| 6,577,342 B1 | 6/2003 | Webster | |
| 6,587,147 B1 | 7/2003 | Li | |
| 6,597,859 B1 | 7/2003 | Leinhardt et al. | |
| 6,606,099 B2 | 8/2003 | Yamada | |
| 6,639,596 B1 * | 10/2003 | Shum | G06K 9/209 345/427 |
| 6,658,168 B1 | 12/2003 | Kim | |
| 6,674,430 B1 | 1/2004 | Kaufman et al. | |
| 6,687,419 B1 | 2/2004 | Atkin | |
| 6,768,980 B1 | 7/2004 | Meyer et al. | |
| 6,785,667 B2 | 8/2004 | Orbanes et al. | |
| 6,833,865 B1 | 12/2004 | Fuller et al. | |
| 6,842,297 B2 | 1/2005 | Dowski, Jr. et al. | |
| 6,900,841 B1 | 5/2005 | Mihara | |
| 6,924,841 B2 | 8/2005 | Jones | |
| 6,927,922 B2 | 8/2005 | George et al. | |
| 7,003,061 B2 | 2/2006 | Wiensky | |
| 7,015,954 B1 | 3/2006 | Foote et al. | |
| 7,025,515 B2 | 4/2006 | Woods | |
| 7,034,866 B1 | 4/2006 | Colmenarez et al. | |
| 7,079,698 B2 | 7/2006 | Kobayashi | |
| 7,102,666 B2 | 9/2006 | Kanade et al. | |
| 7,164,807 B2 | 1/2007 | Morton | |
| 7,206,022 B2 | 4/2007 | Miller et al. | |
| 7,239,345 B1 | 7/2007 | Rogina | |
| 7,286,295 B1 | 10/2007 | Sweatt et al. | |
| 7,304,670 B1 | 12/2007 | Hussey et al. | |
| 7,329,856 B2 | 2/2008 | Ma et al. | |
| 7,336,430 B2 | 2/2008 | George | |
| 7,417,670 B1 | 8/2008 | Linzer et al. | |
| 7,469,381 B2 | 12/2008 | Ording | |
| 7,477,304 B2 | 1/2009 | Hu | |
| 7,587,109 B1 | 9/2009 | Reininger | |
| 7,620,309 B2 | 11/2009 | Georgiev | |
| 7,623,726 B1 | 11/2009 | Georgiev | |
| 7,633,513 B2 | 12/2009 | Kondo et al. | |
| 7,683,951 B2 | 3/2010 | Aotsuka | |
| 7,687,757 B1 | 3/2010 | Tseng et al. | |
| 7,723,662 B2 | 5/2010 | Levoy et al. | |
| 7,724,952 B2 | 5/2010 | Shum et al. | |
| 7,748,022 B1 | 6/2010 | Frazier | |
| 7,847,825 B2 | 12/2010 | Aoki et al. | |
| 7,936,377 B2 | 5/2011 | Friedhoff et al. | |
| 7,936,392 B2 | 5/2011 | Ng et al. | |
| 7,941,634 B2 | 5/2011 | Georgi | |
| 7,945,653 B2 | 5/2011 | Zuckerberg et al. | |
| 7,949,252 B1 | 5/2011 | Georgiev | |
| 7,982,776 B2 | 7/2011 | Dunki-Jacobs et al. | |
| 8,013,904 B2 | 9/2011 | Tan et al. | |
| 8,085,391 B2 | 12/2011 | Machida et al. | |
| 8,106,856 B2 | 1/2012 | Matas et al. | |
| 8,115,814 B2 | 2/2012 | Iwase et al. | |
| 8,155,456 B2 | 4/2012 | Babacan | |
| 8,155,478 B2 | 4/2012 | Vitsnudel et al. | |
| 8,189,089 B1 | 5/2012 | Georgiev et al. | |
| 8,228,417 B1 | 7/2012 | Georgiev et al. | |
| 8,248,515 B2 | 8/2012 | Ng et al. | |
| 8,259,198 B2 | 9/2012 | Cote et al. | |
| 8,264,546 B2 | 9/2012 | Witt | |
| 8,279,325 B2 | 10/2012 | Pitts et al. | |
| 8,289,440 B2 | 10/2012 | Knight et al. | |
| 8,290,358 B1 | 10/2012 | Georgiev | |
| 8,310,554 B2 | 11/2012 | Aggarwal et al. | |
| 8,315,476 B1 | 11/2012 | Georgiev et al. | |
| 8,345,144 B1 | 1/2013 | Georgiev et al. | |
| 8,400,533 B1 | 3/2013 | Szedo | |
| 8,400,555 B1 | 3/2013 | Georgiev et al. | |
| 8,411,948 B2 | 4/2013 | Rother | |
| 8,427,548 B2 | 4/2013 | Lim et al. | |
| 8,442,397 B2 | 5/2013 | Kang et al. | |
| 8,446,516 B2 | 5/2013 | Pitts et al. | |
| 8,494,304 B2 | 7/2013 | Venable et al. | |
| 8,531,581 B2 | 9/2013 | Shroff | |
| 8,542,933 B2 | 9/2013 | Venkataraman et al. | |
| 8,559,705 B2 | 10/2013 | Ng | |
| 8,570,426 B2 | 10/2013 | Pitts et al. | |
| 8,577,216 B2 | 11/2013 | Li et al. | |
| 8,581,998 B2 | 11/2013 | Ohno | |
| 8,589,374 B2 | 11/2013 | Chaudhri | |
| 8,593,564 B2 | 11/2013 | Border et al. | |
| 8,605,199 B2 | 12/2013 | Imai | |
| 8,614,764 B2 | 12/2013 | Pitts et al. | |
| 8,619,082 B1 | 12/2013 | Ciurea et al. | |
| 8,629,930 B2 | 1/2014 | Brueckner et al. | |
| 8,665,440 B1 | 3/2014 | Kompaniets et al. | |
| 8,675,073 B2 | 3/2014 | Aagaard et al. | |
| 8,724,014 B2 | 5/2014 | Ng et al. | |
| 8,736,710 B2 | 5/2014 | Spielberg | |
| 8,736,751 B2 | 5/2014 | Yun | |
| 8,749,620 B1 | 6/2014 | Pitts et al. | |
| 8,750,509 B2 | 6/2014 | Renkis | |
| 8,754,829 B2 | 6/2014 | Lapstun | |
| 8,760,566 B2 | 6/2014 | Pitts et al. | |
| 8,768,102 B1 | 7/2014 | Ng et al. | |
| 8,797,321 B1 | 8/2014 | Bertolami et al. | |
| 8,811,769 B1 | 9/2014 | Pitts et al. | |
| 8,831,377 B2 | 9/2014 | Pitts et al. | |
| 8,848,970 B2 | 9/2014 | Aller et al. | |
| 8,860,856 B2 | 10/2014 | Wetzstein et al. | |
| 8,879,901 B2 | 11/2014 | Caldwell et al. | |
| 8,903,232 B1 | 12/2014 | Caldwell | |
| 8,908,058 B2 | 12/2014 | Akeley et al. | |
| 8,948,545 B2 | 2/2015 | Akeley et al. | |
| 8,953,882 B2 | 2/2015 | Lim et al. | |
| 8,971,625 B2 | 3/2015 | Pitts et al. | |
| 8,976,288 B2 | 3/2015 | Ng et al. | |
| 8,988,317 B1 | 3/2015 | Liang et al. | |
| 8,995,785 B2 | 3/2015 | Knight et al. | |
| 8,997,021 B2 | 3/2015 | Liang et al. | |
| 9,001,226 B1 | 4/2015 | Ng et al. | |
| 9,013,611 B1 | 4/2015 | Szedo | |
| 9,106,914 B2 | 8/2015 | Doser | |
| 9,172,853 B2 | 10/2015 | Pitts et al. | |
| 9,184,199 B2 | 11/2015 | Pitts et al. | |
| 9,201,193 B1 | 12/2015 | Smith | |
| 9,210,391 B1 | 12/2015 | Mills | |
| 9,214,013 B2 | 12/2015 | Venkataraman et al. | |

(56) References Cited

U.S. PATENT DOCUMENTS

| | | |
|---|---|---|
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0043270 A1 | 3/2003 | Rafey |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0104935 A1* | 6/2004 | Williamson ............ G06F 3/012 715/757 |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0008265 A1 | 1/2006 | Ito |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0250322 A1 | 11/2006 | Hall et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2007/0273795 A1 | 11/2007 | Jaynes |
| 2007/0285554 A1* | 12/2007 | Givon ................... G03H 1/268 348/340 |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0109280 A1 | 4/2009 | Gotsman |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0207233 A1 | 8/2009 | Mauchly et al. |
| 2009/0273843 A1 | 11/2009 | Raskar et al. |
| 2009/0295829 A1 | 12/2009 | Georgiev et al. |
| 2009/0309973 A1 | 12/2009 | Kogane |
| 2009/0309975 A1 | 12/2009 | Gordon |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277617 A1 | 11/2010 | Hollinger |
| 2010/0277629 A1 | 11/2010 | Tanaka |
| 2010/0303288 A1 | 12/2010 | Malone |
| 2010/0328485 A1 | 12/2010 | Imamura et al. |
| 2011/0001858 A1 | 1/2011 | Shintani |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |

(56) References Cited

U.S. PATENT DOCUMENTS

| | | |
|---|---|---|
| 2011/0032338 A1 | 2/2011 | Raveendran et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0091192 A1 | 4/2011 | Iwane |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0249341 A1 | 10/2011 | DiFrancesco et al. |
| 2011/0261164 A1 | 10/2011 | Olesen et al. |
| 2011/0261205 A1 | 10/2011 | Sun |
| 2011/0267263 A1 | 11/2011 | Hinckley |
| 2011/0267348 A1 | 11/2011 | Lin |
| 2011/0273466 A1 | 11/2011 | Imai et al. |
| 2011/0279479 A1 | 11/2011 | Rodriguez |
| 2011/0133649 A1 | 12/2011 | Bales et al. |
| 2011/0292258 A1 | 12/2011 | Adler |
| 2011/0293179 A1 | 12/2011 | Dikmen |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0194514 A1* | 8/2012 | Sakaguchi ............ H04N 13/111 345/419 |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0271115 A1 | 10/2012 | Buerk |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120319 A1* | 5/2013 | Givon ................... G06F 3/0425 345/175 |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0121577 A1 | 5/2013 | Wang |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0129213 A1 | 5/2013 | Shectman |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0243391 A1 | 9/2013 | Park et al. |
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342526 A1 | 12/2013 | Ng et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0168484 A1 | 6/2014 | Suzuki |
| 2014/0176540 A1 | 6/2014 | Tosic et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0245367 A1 | 8/2014 | Sasaki |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0333787 A1 | 11/2014 | Venkataraman |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |

(56) References Cited

U.S. PATENT DOCUMENTS

| | | |
|---|---|---|
| 2014/0368640 A1 | 12/2014 | Strandemar et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0104101 A1 | 4/2015 | Bryant et al. |
| 2015/0124062 A1* | 5/2015 | Didyk .................. H04N 13/122 348/51 |
| 2015/0130986 A1 | 5/2015 | Ohnishi |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0237273 A1 | 8/2015 | Sawadaishi |
| 2015/0288867 A1 | 10/2015 | Kajimura |
| 2015/0304544 A1 | 10/2015 | Eguchi |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0346832 A1 | 12/2015 | Cole et al. |
| 2015/0370011 A1 | 12/2015 | Ishihara |
| 2015/0370012 A1 | 12/2015 | Ishihara |
| 2015/0373279 A1 | 12/2015 | Osborne |
| 2016/0029017 A1 | 1/2016 | Liang |
| 2016/0065931 A1 | 3/2016 | Konieczny |
| 2016/0065947 A1 | 3/2016 | Cole et al. |
| 2016/0142615 A1 | 5/2016 | Liang et al. |
| 2016/0155215 A1 | 6/2016 | Suzuki |
| 2016/0165206 A1 | 6/2016 | Huang et al. |
| 2016/0173844 A1 | 6/2016 | Knight et al. |
| 2016/0191823 A1 | 6/2016 | El-Ghoroury |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0353006 A1 | 12/2016 | Anderson |
| 2016/0353026 A1 | 12/2016 | Blonde et al. |
| 2016/0381348 A1 | 12/2016 | Hayasaka |
| 2017/0031146 A1 | 2/2017 | Zheng |
| 2017/0059305 A1 | 3/2017 | Nonn et al. |
| 2017/0061635 A1 | 3/2017 | Oberheu et al. |
| 2017/0067832 A1 | 3/2017 | Ferrara, Jr. et al. |
| 2017/0078578 A1 | 3/2017 | Sato |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0221226 A1 | 8/2017 | Shen |
| 2017/0237971 A1 | 8/2017 | Pitts et al. |
| 2017/0243373 A1 | 8/2017 | Bevensee et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0358092 A1 | 12/2017 | Bleibel et al. |
| 2017/0365068 A1 | 12/2017 | Tan et al. |
| 2017/0374411 A1 | 12/2017 | Lederer et al. |
| 2018/0007253 A1 | 1/2018 | Abe |
| 2018/0012397 A1 | 1/2018 | Carothers |
| 2018/0020204 A1 | 1/2018 | Pang et al. |
| 2018/0024753 A1 | 1/2018 | Gewickey et al. |
| 2018/0033209 A1 | 2/2018 | Akeley et al. |
| 2018/0034134 A1 | 2/2018 | Pang et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0089903 A1 | 3/2018 | Pang et al. |
| 2018/0097867 A1 | 4/2018 | Pang et al. |
| 2018/0158198 A1 | 6/2018 | Karnad |
| 2018/0176483 A1* | 6/2018 | Knorr .................. G06T 19/006 |
| 2018/0255319 A1* | 9/2018 | Thoreau ............... H04N 19/597 |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 06039486 | 4/2006 |
| WO | 07092545 | 8/2007 |
| WO | 07092581 | 8/2007 |
| WO | 2011010234 | 3/2011 |
| WO | 2011029209 | 7/2011 |
| WO | 2011081187 | 7/2011 |

OTHER PUBLICATIONS

Heidelberg Collaboratory for Image Processing, "Consistent Depth Estimation in a 4D Light Field", May 2013.

Kopf, J., et al., Deep Photo: Model-Based Photograph Enhancement and Viewing, SIGGRAPH Asia 2008.

Levin, A., et al., "Image and Depth from a Conventional Camera with a Coded Aperture", SIGGRAPH 2007, pp. 1-9.

Ng, R., et al. "Light Field Photography with a Hand-held Plenoptic Camera," Stanford Technical Report, CSTR 2005-2, 2005.

Ng, R., "Digital Light Field Photography," Dissertation, Department of Computer Science, Stanford University, Jun. 2006.

Ng, R., "Fourier Slice Photography," ACM Transactions on Graphics, Proceedings of SIGGRAPH 2005, vol. 24, No. 3, 2005, pp. 735-744.

Nguyen, Hubert. "Practical Post-Process Depth of Field." GPU Gems 3. Upper Saddle River, NJ: Addison-Wesley, 2008.

Tao, Michael, et al., "Depth from Combining Defocus and Correspondence Using Light-Field Cameras", Dec. 2013.

Wanner, S., et al., "Variational Light Field Analysis for Disparity Estimation and Super-Resolution", IEEE Transactions on Pattern Analysis and Machine Intelligence, 2013.

Wanner, S., et al., "Globally Consistent Depth Labeling of 4D Light Fields", IEEE Conference on Computer Vision and Pattern Recognition, 2012.

Wikipedia—Portable Network Graphics format: http://en.wikipedia.org/wiki/Portable_Network_Graphics. Retrieved Jan. 2013.

Wikipedia—Unsharp Mask Technique: https://en.wikipedia.org/wiki/Unsharp_masking. Retrieved May 3, 2016.

Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.

Wilburn, Bennett, et al., "High Speed Video Using a Dense Camera Array", 2004.

Wilburn, Bennett, et al., "The Light Field Video Camera", Proceedings of Media Processors 2002.

Williams, L. "Pyramidal Parametrics," Computer Graphic (1983).

Winnemoller, H., et al., "Light Waving: Estimating Light Positions From Photographs Alone", Eurographics 2005.

Wippermann, F. "Chirped Refractive Microlens Array," Dissertation 2007.

Wuu, S., et al., "A Manufacturable Back-Side Illumination Technology Using Bulk Si Substrate for Advanced CMOS Image Sensors", 2009 International Image Sensor Workshop, Bergen, Norway.

Wuu, S., et al., "BSI Technology with Bulk Si Wafer", 2009 International Image Sensor Workshop, Bergen, Norway.

Xiao, Z. et al., "Aliasing Detection and Reduction in Plenoptic Imaging," IEEE Conference on Computer Vision and Pattern Recognition; 2014.

Xu, Xin et al., "Robust Automatic Focus Algorithm for Low Contrast Images Using a New Contrast Measure," Sensors 2011; 14 pages.

Zheng, C. et al., "Parallax Photography: Creating 3D Cinematic Effects from Stills", Proceedings of Graphic Interface, 2009.

Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.

(56) References Cited

OTHER PUBLICATIONS

Zoberbier, M., et al., "Wafer Cameras—Novel Fabrication and Packaging Technologies", 2009 International Image Senor Workshop, Bergen, Norway, 5 pages.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.
Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method" , 1911, pp. 23-29.
Sony Corp, "Interchangeable Lens Digital Camera Handbook", 2011.
Sony, Sony's First Curved Sensor Photo: http://www.engadget.com; Jul. 2014.
Stensvold, M., "Hybrid AF: A New Approach to Autofocus Is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.

Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Platform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of VBR_encoding. Retrieved Jan. 2013.
U.S. Appl. No. 15/967,076, filed Apr. 30, 2018 listing Jiantao Kuang et al. as inventors, entitled "Automatic Lens Flare Detection and Correction for Light-Field Images".
U.S. Appl. No. 15/666,298, filed Aug. 1, 2017 listing Yonggang Ha et al. as inventors, entitled "Focal Reducer With Controlled Optical Properties for Interchangeable Lens Light-Field Camera".
U.S. Appl. No. 15/590,808, filed May 9, 2017 listing Alex Song et al. as inventors, entitled "Adaptive Control for Immersive Experience Delivery".
U.S. Appl. No. 15/864,938, filed Jan. 8, 2018 listing Jon Karafin et al. as inventors, entitled "Motion Blur for Light-Field Images".
U.S. Appl. No. 15/703,553, filed Sep. 13, 2017 listing Jon Karafin et al. as inventors, entitled "4D Camera Tracking and Optical Stabilization".
U.S. Appl. No. 15/590,841, filed May 9, 2017 listing Kurt Akeley et al. as inventors, entitled "Vantage Generation and Interactive Playback".
U.S. Appl. No. 15/590,951, filed May 9, 2017 lisiting Alex Song et al. as inventors, entitled "Wedge-Based Light-Field Video Capture".
U.S. Appl. No. 15/944,551, filed Apr. 3, 2018 listing Zejing Wang et al. as inventors, entitled "Generating Dolly Zoom Effect Using Light Field Image Data".
U.S. Appl. No. 15/874,723, filed Jan. 18, 2018 listing Mark Weir et al. as inventors, entitled "Multi-Camera Navigation Interface".
U.S. Appl. No. 15/897,994, filed Feb. 15, 2018 listing Trevor Carothers et al. as inventors, entitled "Generation of Virtual Reality with 6 Degrees of Freesom From Limited Viewer Data".
U.S. Appl. No. 15/897,836, filed Feb. 15, 2018 listing Francois Bleibel et al. as inventors, entitled "Multi-View Contour Tracking".
U.S. Appl. No. 15/897,942, filed Feb. 15, 2018 listing Francois Bleibel et al. as inventors, entitled "Multi-View Contour Tracking With Grabcut".

(56) References Cited

OTHER PUBLICATIONS

Adelsberger, R. et al., "Spatially Adaptive Photographic Flash," ETH Zurich, Department of Computer Science, Technical Report 612, 2008, pp. 1-12.
Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend.displayTab2html. Retrieved Jan. 2013.
Agarwala, A., et al., "Interactive Digital Photomontage," ACM Transactions on Graphics, Proceedings of SIGGRAPH 2004, vol. 32, No. 3, 2004.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Meng, J. et al., "An Approach on Hardware Design for Computational Photography Applications Based on Light Field Refocusing Algorithm," Nov. 18, 2007, 12 pages.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54.
Groen et al., "A Comparison of Different Focus Functions for Use in Autofocus Algorithms," Cytometry 6:81-91, 1985.
Heide, F. et al., "High-Quality Computational Imaging Through Simple Lenses," ACM Transactions on Graphics, SIGGRAPH 2013; pp. 1-7.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Lehtinen, J., et al. "Matrix radiance transfer", in Symposium on Interactive 3D Graphics, 59-64, 2003.
Lesser, Michael, "Back-Side Illumination", 2009.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.

(56) References Cited

OTHER PUBLICATIONS

Liang, Chia-Kai, et al., "Programmable Aperture Photography: Multiplexed Light Field Acquisition", ACM SIGGRAPH, 2008.

Lippmann, "Reversible Prints", Communication at the French Society of Physics, Journal of Physics, 7 , 4, Mar. 1908, pp. 821-825.

Lumsdaine et al., "Full Resolution Lightfield Rendering" Adobe Technical Report Jan. 2008, pp. 1-12.

Maeda, Y. et al., "A CMOS Image Sensor with Pseudorandom Pixel Placement for Clear Imaging," 2009 International Symposium on Intelligent Signal Processing and Communication Systems, Dec. 2009.

Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.

Mallat, Stephane, "A Wavelet Tour of Signal Processing", Academic Press 1998.

Malzbender, et al., "Polynomial Texture Maps", Proceedings SIGGRAPH 2001.

Marshall, Richard J. et al., "Improving Depth Estimation from a Plenoptic Camera by Patterned Illumination," Proc. of SPIE, vol. 9528, 2015, pp. 1-6.

Masselus, Vincent, et al., "Relighting with 4D Incident Light Fields", SIGGRAPH 2003.

Meynants, G., et al., "Pixel Binning in CMOS Image Sensors," Frontiers in Electronic Imaging Conference, 2009.

Moreno-Noguer, F. et al., "Active Refocusing of Images and Videos," ACM Transactions on Graphics, Aug. 2007; pp. 1-9.

Munkberg, J. et al., "Layered Reconstruction for Defocus and Motion Blur" EGSR 2014, pp. 1-12.

Naemura et al., "3-D Computer Graphics based on Integral Photography" Optics Express, Feb. 12, 2001. vol. 8, No. 2, pp. 255-262.

Nakamura, J., "Image Sensors and Signal Processing for Digital Still Cameras" (Optical Science and Engineering), 2005.

National Instruments, "Anatomy of a Camera," pp. 1-5, Sep. 6, 2006.

Nayar, Shree, et al., "Shape from Focus", IEEE Transactions on Pattern Analysis and Machine Intelligence, vol. 16, No. 8, pp. 824-831, Aug. 1994.

Ng, R., et al., "All-Frequency Shadows Using Non-linear Wavelet Lighting Approximation. ACM Transactions on Graphics," ACM Transactions on Graphics; Proceedings of SIGGRAPH 2003.

Ng, R., et al., "Triple Product Wavelet Integrals for All-Frequency Relighting", ACM Transactions on Graphics (Proceedings of SIGGRAPH 2004).

Nimeroff, J., et al., "Efficient rendering of naturally illuminatied environments" in Fifth Eurographics Workshop on Rendering, 359-373, 1994.

Nokia, "City Lens", May 2012.

Ogden, J., "Pyramid-Based Computer Graphics", 1985.

Okano et al., "Three-dimensional video system based on integral photography" Optical Engineering, Jun. 1999. vol. 38, No. 6, pp. 1072-1077.

Orzan, Alexandrina, et al., "Diffusion Curves: A Vector Representation for Smooth-Shaded Images," ACM Transactions on Graphics—Proceedings of SIGGRAPH 2008; vol. 27; 2008.

Pain, B., "Back-Side Illumination Technology for SOI-CMOS Image Sensors", 2009.

Perez, Patrick et al., "Poisson Image Editing," ACM Transactions on Graphics—Proceedings of ACM SIGGRAPH 2003; vol. 22, Issue 3; Jul. 2003; pp. 313-318.

Petschnigg, George, et al., "Digial Photography with Flash and No-Flash Image Pairs", SIGGRAPH 2004.

\* cited by examiner

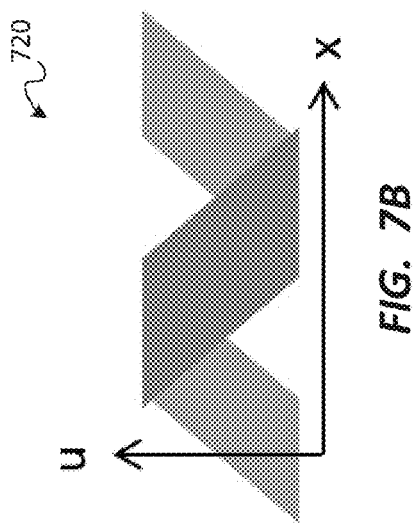
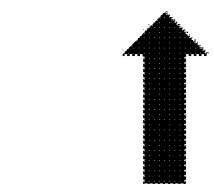
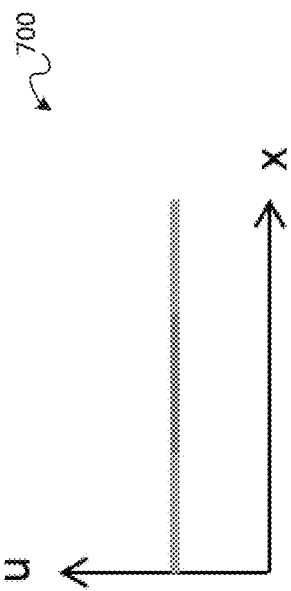
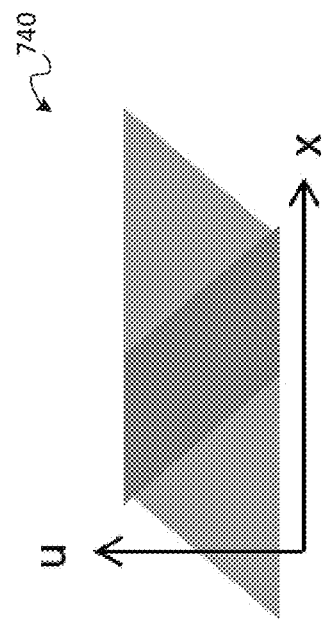

MULTI-VIEW BACK-PROJECTION TO A LIGHT-FIELD

CROSS-REFERENCE TO RELATED APPLICATION

The present application is related to U.S. Utility application Ser. No. 14/302,826 for "Depth Determination for Light-Field Images", filed on Jun. 12, 2014 and issued on Mar. 24, 2015 as U.S. Pat. No. 8,988,317, which is incorporated herein by reference.

The present application is also related to U.S. Utility application Ser. No. 12/703,367 for "Light-Field Camera Image, File and Configuration Data, and Method of Using, Storing and Communicating Same,", filed on Feb. 10, 2010, which is incorporated herein by reference.

The present application is also related to U.S. Utility application Ser. No. 13/774,971 for "Compensating for Variation in Microlens Position During Light-Field Image Processing,", filed on Feb. 22, 2013 and issued on Sep. 9, 2014 as U.S. Pat. No. 8,831,377, which is incorporated herein by reference.

TECHNICAL FIELD

The present disclosure relates to systems and methods for reconstructing dense light-field data from sparse light-field data and/or from image data that does not include light-field data.

BACKGROUND

Light-field imaging is the capture of four-dimensional light-field data that provides not only spatial information regarding light received from a scene, but also angular information indicative of the angle of incidence of light received from the scene by the camera's optical elements. Such four-dimensional information may be used to reconstruct a variety of two-dimensional images, including images at various focus depths, relative to the camera. More precisely, a plurality of sub-aperture images may be projected from a light-field. Each of these two-dimensional sub-aperture images can be considered a two-dimensional slice of the four-dimensional information. In a plenoptic light-field camera, a microlens array is used to capture an array of smaller images, each of which pertains to one of the microlenses. Each sub-aperture image is the image captured by combining pixels at the same location in each of the smaller images.

Unfortunately, known systems and methods lack the ability to easily generate four-dimensional light-field data from image data that does not include light-field data, or from image data that includes sparse light-field data.

SUMMARY

According to various embodiments, dense light-field data can be generated from image data that does not include light-field data, or from image data that includes sparse light-field data. In at least one embodiment, the source light-field data may include one or more sub-aperture images that may be used to reconstruct the light-field in denser form. The source light-field may depict, for example, a two-dimensional or four-dimensional light-field. A first sub-aperture image that depicts the light-field from a first viewpoint may be retrieved, and a first value of interest pertinent to the first sub-aperture may be obtained. For a two-dimensional light-field, the first sub-aperture image may be a one-dimensional image. For a four-dimensional light-field, the first sub-aperture image may be a two-dimensional image.

The first value of interest may be used to generate the reconstructed light-field by extrapolating corresponding values for other sub-aperture images. The other sub-aperture images may include second and third sub-aperture images that depict the light-field from second and third viewpoints, respectively. Extrapolating the corresponding values may include extrapolating second and third values pertinent to the second and third sub-aperture images, respectively, based on relative positions of the first, second, and third viewpoints. Additional sub-aperture images may be retrieved and used to help fill holes in the reconstructed light-field resulting from occlusions caused by overlap of objects visible from the viewpoint(s) from which the sub-aperture images are captured.

The values of interest may be depths of one or more objects visible in the reconstructed light-field. Additionally or alternatively, the values of interest may be image values, such as hue, luminance, saturation, intensity, and/or color value, for the reconstructed light-field. Image values may be reconstructed by back-projecting images and depth maps for each of multiple viewpoints, and then combining the resulting light-fields into the reconstructed light-field. Additionally or alternatively, image values may be reconstructed by back-projecting depth maps first to generate a depth-field for the reconstructed light-field. The depth-field may then be used to back-project the images from the multiple viewpoints to generate the reconstructed light-field.

In other embodiments, the source data can take other forms. For example, in at least one embodiment, it can be data derived from or ancillary to a set of sub-aperture images. This data may include, for example, optical flow vectors, alpha masks, contours, gradients, surface normals, and/or the like.

In another embodiment, the source data can be synthetic data. For example, the source data may include computer-generated imagery that includes depth information; the equivalent of sub-aperture images can be generated from such synthetic data and used in the manner described herein to generate a reconstructed light-field.

In yet another embodiment, the source data can include captured image data that includes views and depth information, but does not include full light-field data. The captured views can be used as the equivalent of sub-aperture images, for applicability to the techniques described herein.

BRIEF DESCRIPTION OF THE DRAWINGS

The accompanying drawings depict several embodiments. Together with the description, they serve to explain the principles of the embodiments. One skilled in the art will recognize that the particular embodiments depicted in the drawings are merely exemplary, and are not intended to limit scope.

FIGS. 7A through 7C are a one-dimensional image, a two-dimensional light-field, and an original light-field, respectively, in which the two-dimensional light-field has been reconstructed from the one-dimensional image, according to one embodiment.

DEFINITIONS

Figure 1:
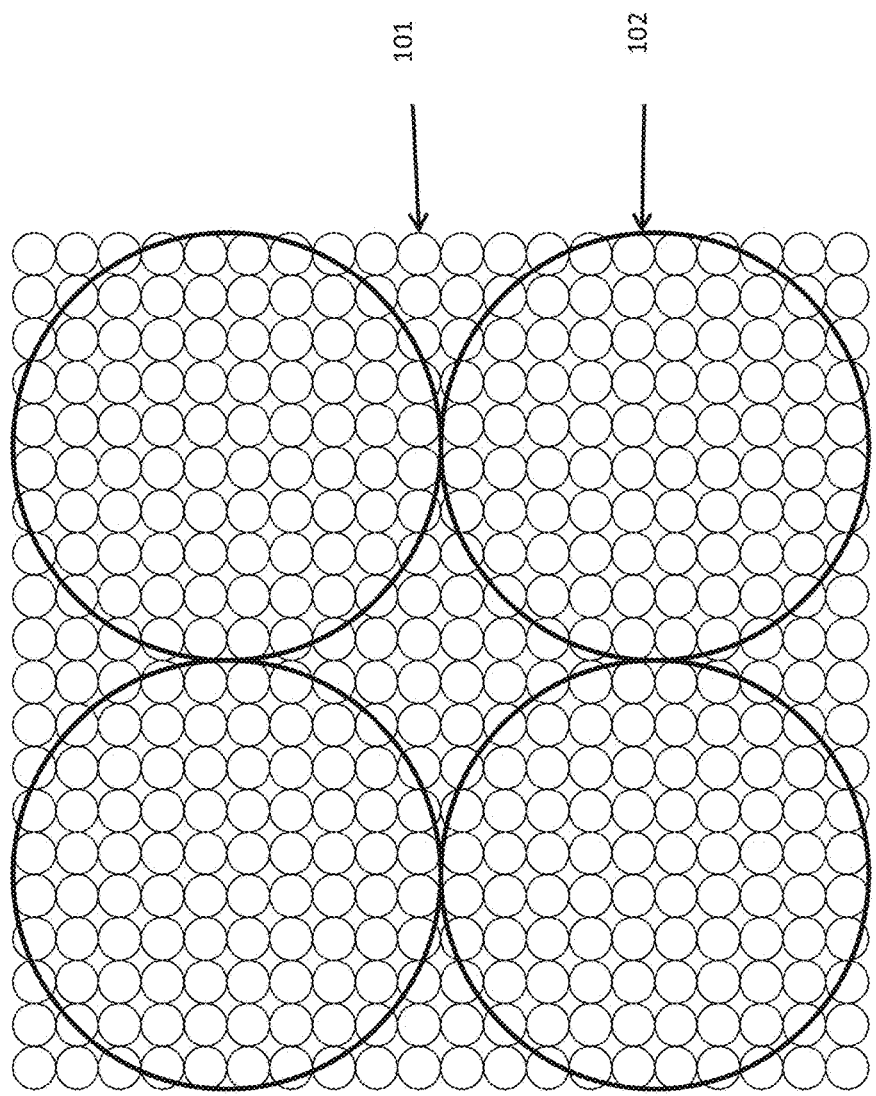
FIG. 1 depicts a portion of a light-field image, according to one embodiment.

For purposes of the description provided herein, the following definitions are used:

Aperture: an opening through which light enters a camera.

Conventional image: an image that does not include angular information regarding captured rays of light (most commonly a two-dimensional image of a scene).

Data store: a hardware element that provides volatile or nonvolatile digital data storage.

Depth-field: depth data for every light-field ray indicative of the depth of one or more object in a scene, from multiple viewpoints.

Disk: a region in a light-field image that is illuminated by light passing through a single microlens; may be circular or any other suitable shape.

Epipolar image: an image formed by taking the (x,u) slice of the light-field at each (y, v), or (y,v) slice at each (x, u). This is defined in more detail in U.S. Utility application Ser. No. 14/302,826 for "Depth Determination for Light-Field Images", filed on Jun. 12, 2014 and issued on Mar. 24, 2015 as U.S. Pat. No. 8,988,317, which is incorporated herein by reference.

Epipolar slope: the slope of a line in an epipolar image. Lines in an epipolar image correspond to points in the real world, with the slope being proportional to its depth.

Four-dimensional coordinate, or 4-D coordinate: The coordinates (x, y, u, v) used to index a four-dimensional light-field sample. (x, y) may be referred to as the spatial coordinate and (u, v) may be referred to as the angular coordinate. In a plenoptic light-field camera, (x, y) is the coordinate of the intersection point of a light ray with the microlens array, and (u, v) is that with the aperture plane.

Image: a two-dimensional array of pixel values, or pixels, each specifying a color.

Image data: digital data captured at a sensor that contains at least a portion of an image Image sensor, sensor, or photosensor: a sensor that produces electrical signals in proportion to light received.

Light-field, or light-field data: image data representing a scene from multiple viewpoints. A light-field can exist in a variety of dimensions, such as two dimensions or four dimensions, with four dimensions being the most commonly captured for viewing. A light-field need not necessarily represent a scene in the real world, but may instead be represent a virtual scene such as a computer-generated scene.

Light-field image: an image that contains a representation of light-field data captured at the sensor, including information regarding the angle at which light is received in the sensor. Light-field images are most commonly four-dimensional images, with two spatial coordinates and two angular coordinates, but may take other forms.

Main lens: a lens or set of lenses that directs light from a scene along an optical path leading to an image sensor Microlens: a small lens, typically one in an array of similar microlenses.

Microlens array: a pattern of microlenses.

Plenoptic light-field camera: a camera that uses a microlens array to capture four-dimensional light-field data.

Reconstructed light-field: a light-field that has been generated through the use of a subset of data representative of an entire light-field, such as one or more views of the entire light-field, which may be obtained from light-field image data, conventional image data, and/or synthetic image data.

Sub-aperture image: for a plenoptic light-field camera, an image generated from light-field data from the same location on each microlens of a microlens array.

Synthetic data: data regarding a synthetic scene, such as view and/or image data, as opposed to a scene that exists in the real world. Synthetic data is typically generated rather than captured.

View: an image formed by taking the (x,y) slice of the light-field at a (u,v) coordinate; equivalent to and inclusive of a sub-aperture image for a plenoptic light-field camera.

Value of interest: value to be reconstructed in a reconstructed light-field, such as depth and/or image values.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 2:
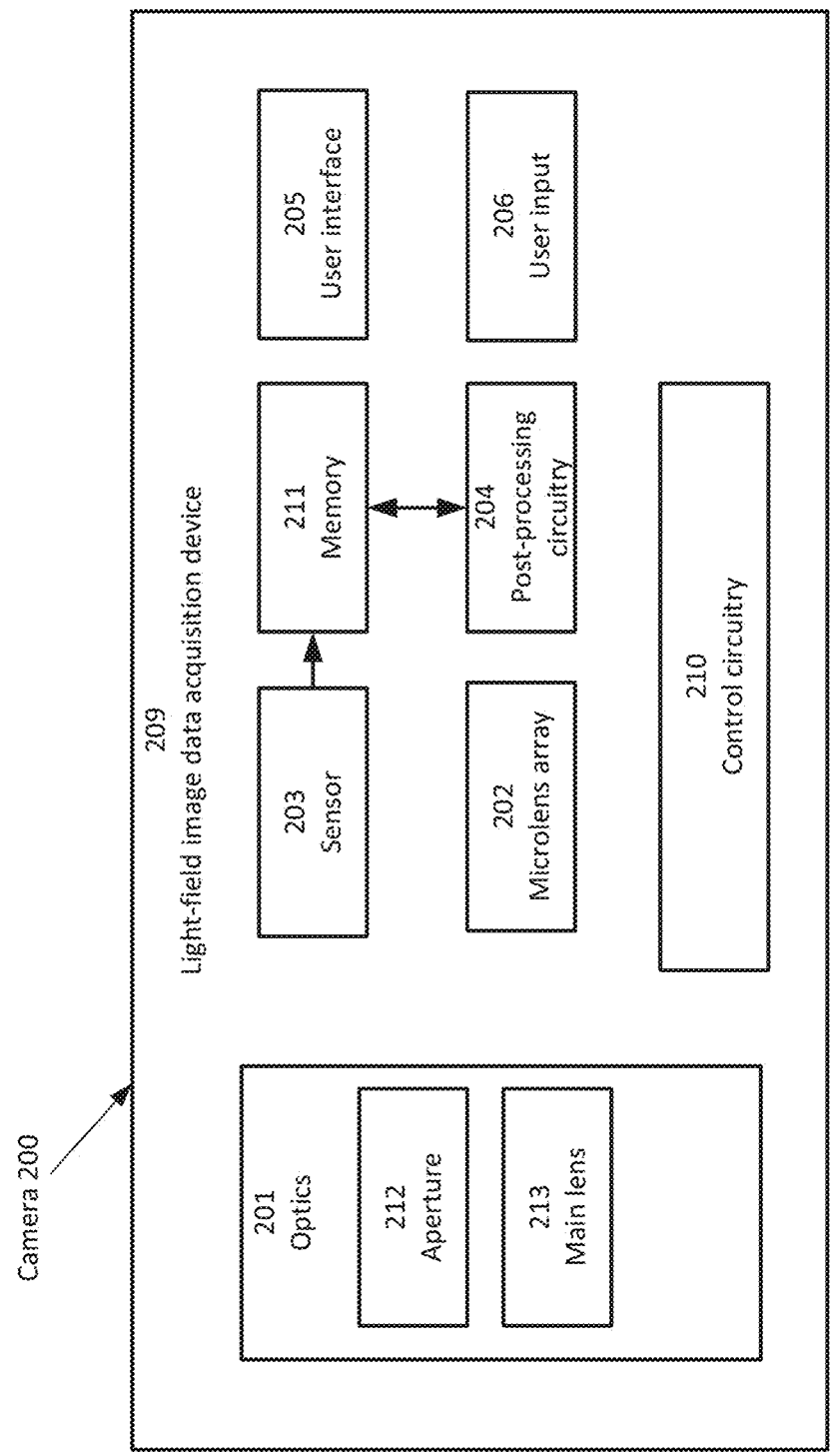
FIG. 2 depicts an example of an architecture for implementing the methods of the present disclosure in a light-field capture device, according to one embodiment.
Figure 3:
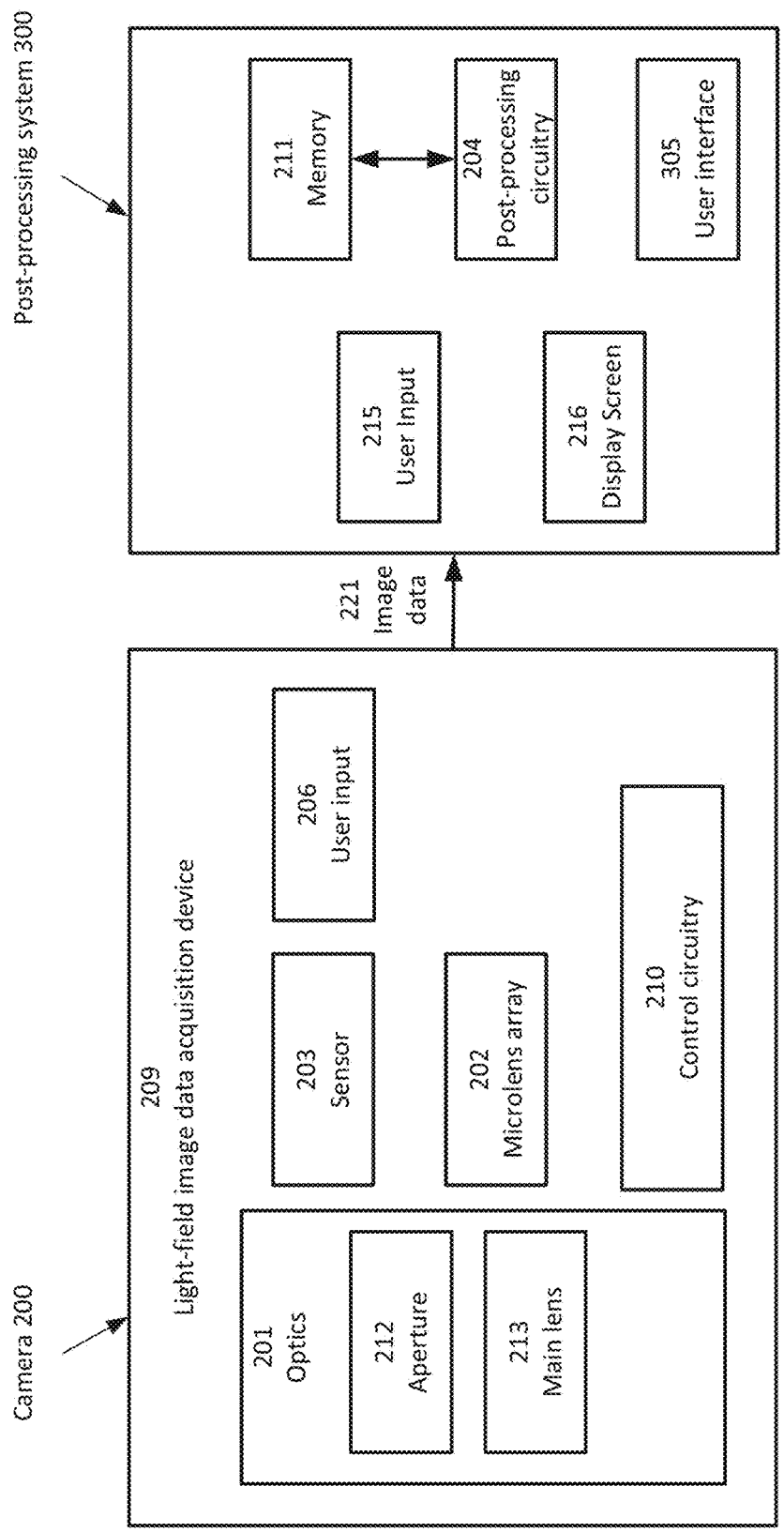
FIG. 3 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 2, there is shown a block diagram depicting an architecture for implementing the method of the present disclosure in a light-field capture device such as a camera 200. Referring now also to FIG. 3, there is shown a block diagram depicting an architecture for implementing the method of the present disclosure in a post-processing system 300 communicatively coupled to a light-field capture device such as a camera 200, according to one embodiment. One skilled in the art will recognize that the particular configurations shown in FIGS. 2 and 3 are merely exemplary, and that other architectures are possible for camera 200. One skilled in the art will further recognize that several of the components shown in the configurations of FIGS. 2 and 3 are optional, and may be omitted or reconfigured.

Figure 4:
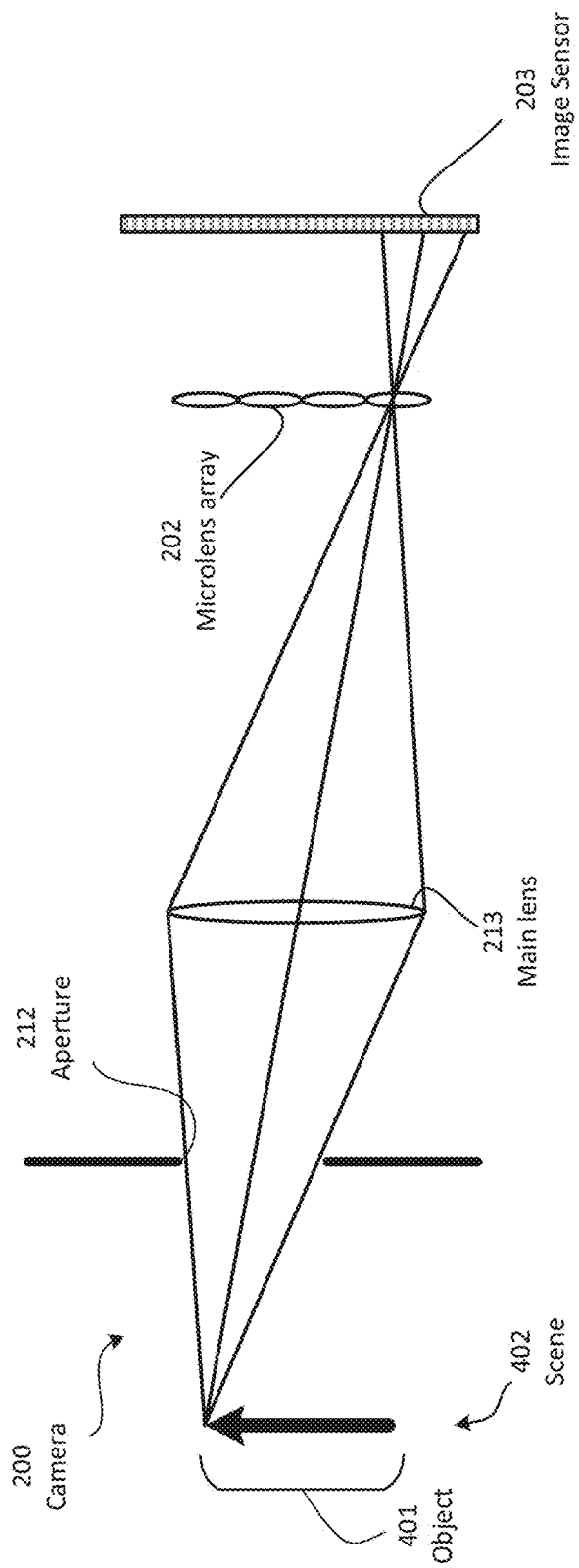
FIG. 4 depicts an example of an architecture for a light-field camera for implementing the methods of the present disclosure according to one embodiment.

In at least one embodiment, camera 200 may be a light-field camera that includes light-field image data acquisition device 209 having optics 201, image sensor 203 (including a plurality of individual sensors for capturing pixels), and microlens array 202. Optics 201 may include, for example, aperture 212 for allowing a selectable amount of light into camera 200, and main lens 213 for focusing light toward microlens array 202. In at least one embodiment, microlens array 202 may be disposed and/or incorporated in the optical path of camera 200 (between main lens 213 and image sensor 203) so as to facilitate acquisition, capture, sampling of, recording, and/or obtaining light-field image data via image sensor 203. Referring now also to FIG. 4, there is shown an example of an architecture for a light-field camera, or camera 200, for implementing the method of the present disclosure according to one embodiment. The Figure is not shown to scale. FIG. 4 shows, in conceptual form, the relationship between aperture 212, main lens 213, microlens array 202, and image sensor 203, as such components interact to capture light-field data for one or more objects, represented by an object 401, which may be part of a scene 402.

In at least one embodiment, camera 200 may also include a user interface 205 for allowing a user to provide input for controlling the operation of camera 200 for capturing, acquiring, storing, and/or processing image data. The user interface 205 may receive user input from the user via an input device 206, which may include any one or more user input mechanisms known in the art. For example, the input device 206 may include one or more buttons, switches, touch screens, gesture interpretation devices, pointing devices, and/or the like.

Similarly, in at least one embodiment, post-processing system 300 may include a user interface 305 that allows the user to initiate processing, viewing, and/or other output of light-field images. The user interface 305 may additionally or alternatively facilitate the receipt of user input from the user to establish one or more parameters of subsequent image processing.

In at least one embodiment, camera 200 may also include control circuitry 210 for facilitating acquisition, sampling, recording, and/or obtaining light-field image data. For example, control circuitry 210 may manage and/or control (automatically or in response to user input) the acquisition timing, rate of acquisition, sampling, capturing, recording, and/or obtaining of light-field image data.

In at least one embodiment, camera 200 may include memory 211 for storing image data, such as output by image sensor 203. Such memory 211 can include external and/or internal memory. In at least one embodiment, memory 211 can be provided at a separate device and/or location from camera 200.

For example, camera 200 may store raw light-field image data, as output by image sensor 203, and/or a representation thereof, such as a compressed image data file. In addition, as described in related U.S. Utility application Ser. No. 12/703,367 for "Light-Field Camera Image, File and Configuration Data, and Method of Using, Storing and Communicating Same,", filed on Feb. 10, 2010 and incorporated herein by reference, memory 211 can also store data representing the characteristics, parameters, and/or configurations (collectively "configuration data") of device 209. The configuration data may include light-field image capture parameters such as zoom and focus settings.

In at least one embodiment, captured image data is provided to post-processing circuitry 204. The post-processing circuitry 204 may be disposed in or integrated into light-field image data acquisition device 209, as shown in FIG. 2, or it may be in a separate component external to light-field image data acquisition device 209, as shown in FIG. 3. Such separate component may be local or remote with respect to light-field image data acquisition device 209. Any suitable wired or wireless protocol can be used for transmitting image data 221 to circuitry 204; for example, the camera 200 can transmit image data 221 and/or other data via the Internet, a cellular data network, a Wi-Fi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 215 and/or a display screen 216. If desired, light-field image data may be displayed for the user on the display screen 216.

Light-Field Imaging Overview

Light-field images often include a plurality of projections (which may be circular or of other shapes) of aperture 212 of camera 200, each projection taken from a different vantage point on the camera's focal plane. The light-field image may be captured on image sensor 203. The interposition of microlens array 202 between main lens 213 and image sensor 203 causes images of aperture 212 to be formed on image sensor 203, each microlens in microlens array 202 projecting a small image of main-lens aperture 212 onto image sensor 203. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 200 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 101; for illustrative purposes, each disk 102 is ten pixels 101 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing,", filed on Feb. 22, 2013 and issued on Sep. 9, 2014 as U.S. Pat. No. 8,831,377, the disclosure of which is incorporated herein by reference, a virtual surface of projection may be introduced, and the intersections of representative rays with the virtual surface can be computed. The color of each representative ray may be taken to be equal to the color of its corresponding pixel.

Light-Field Reconstruction

There are many instances in which it may be desirable to construct, or reconstruct, a dense light-field from sparse light-field image data, or from image data that does not include light-field data. Four applications for these techniques will be discussed herein; those of skill in the art will recognize that these are merely exemplary, and the systems and methods provided herein may be used in many other instances.

First, the light-field may be captured with a light-field camera, but may not be captured with the desired level of density, or may not be preserved in the course of data transmission and/or processing. For example, if the light-field camera used to capture the light-field does not provide the desired angular resolution, it may be desirable to reconstruct the light-field so that it has higher resolution than that with which it was captured. Similarly, if the light-field data captured initially are compressed for storage and/or transmission, it may be desirable to reconstruct the density of the original light-field. In such instances, the systems and methods provided herein may be used to fill out the density of the light-field through the extrapolation of re-projections, such as sub-aperture views, of the sparse light-field.

Second, it may be desirable to utilize data derived from or ancillary to such sub-aperture images to reconstruct the light-field. For example, optical flow vectors, alpha masks, contours, gradients, surface normals, and/or the like may be obtained in connection with sub-aperture views. Such ancillary data may be used, for example, to apply traditional two-dimensional image processing techniques to a light-field without the need to rework them for four-dimensional application. Rather, such ancillary data may be extended from one or more views to additional views in order to apply image processing across the light-field.

Third, a light-field may be generated from synthetic data (i.e., image data that has not been captured by a camera). For example, computer generated renders from a camera rig, deep images, matte paintings, and/or the like may be used to provide image data from which a light-field may be constructed. In some embodiments, the synthetic data may optionally be used as the basis of a light-field that matches a captured light-field in some respects. Notably, in this application, "reconstruction" of a light-field will be interpreted to include construction of a light-field that never actually existed, as may be accomplished with re-projection of synthetic image data.

Fourth, a light-field may be generated based on the capture of non-light-field data, such as conventional imagery. For example, one or more camera rigs may be used to capture one or more images and/or associated depth information, without capturing the full light-field. The one or more camera rigs may be conventional cameras rather than light-field cameras. The systems and methods provided herein may be used to extrapolate the full light-field based on the limited images and/or depth information captured. Again, in this application, "reconstruction" of a light-field will be interpreted to include construction of a light-field that never actually existed.

The present disclosure will focus on the first use case provided above, i.e., use of sparse light-field data to reconstruct a denser light-field, by way of example. Thus, in many instances, the description below refers to sub-aperture images. However, those of skill in the art will recognize that the methods and techniques applied below to sub-aperture images may also be applied to any type of image data, which may include any type of view, including but not limited to sub-aperture images, views obtained from conventional images, and views obtained from synthetic image data, as mentioned above. In such applications and embodiments, the system may generate or obtain image data that is used as the equivalent of sub-aperture images for purposes of reconstruction or generation of a light-field using the techniques described herein.

Traditionally, generating a light-field requires a large number of views as input. Via the approach provided in the present disclosure, a smaller subset of views and a subset of depth maps may be used to reconstruct the light-field. In this application, the term "reconstruct" does not require the precise replication of an original light-field, but rather applies to approximations, with the possibility of loss of some color and/or depth information from the light-field to be reconstructed, or to generation of a new light-field based on synthetic image data. Furthermore, as mentioned above, such "reconstruction" can include techniques for generating a light-field where none existed before.

Figure 5:
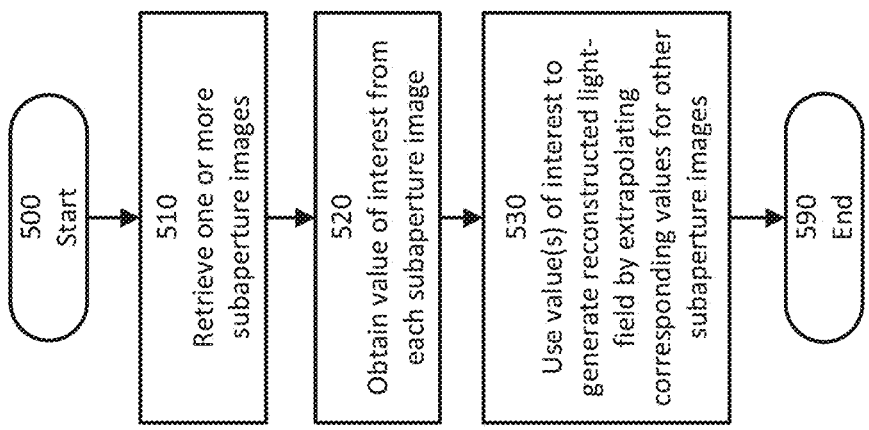
FIG. 5 is a flowchart diagram depicting a method by which a light-field may be reconstructed through the use of one or more sub-aperture images, according to one embodiment.

Referring to FIG. 5, a method is depicted, by which a light-field may be reconstructed through the use of one or more sub-aperture images, according to one embodiment. The light-field may have been captured by one or more plenoptic light-field cameras such as the light-field camera 200 of FIG. 2. Additionally or alternatively, the light-field may have been captured through the use of a different camera system.

The method may start 500 with a step 510 in which one or more sub-aperture images may be retrieved, for example, from a data store such as the memory 211 of the light-field camera 200 of FIG. 2 and/or the memory 211 of the post-processing system 300 of FIG. 3. The sub-aperture images may have been previously stored, for example, as part of a data compression process for reducing the stored size of the light-field. The sub-aperture images may be generated from the light-field to be reconstructed. As mentioned previously, the sub-aperture images may be generated by combining the pixels at the same location on each of the disk images of the light-field image. As mentioned previously, other types of image data can be used in place of sub-aperture images, particularly in applications where the light-field is being generated where none existed before.

In a step 520, a value of interest may be obtained from each of the one or more sub-aperture images. This value of interest may be the value that is to be reconstructed in the reconstructed light-field. For example, the value of interest may be a depth of one or more objects depicted in the sub-aperture images, if reconstructing the light-field is to include reconstruction of depth data. Additionally or alternatively, if reconstruction of the light-field is to include reconstruction of image data (for example, hue, luminance, saturation, and/or intensity data), the value of interest may be the image data for one or more pixels of the one or more sub-aperture images.

In a step 530, the value(s) of interest obtained in the step 520 may be used to generate the reconstructed light-field by extrapolating corresponding values for other sub-aperture images. This may yield values of interest, such as depth values and/or image values, for other sub-aperture images that were not retrieved in the step 510. These values of interest may be used, for example, via back-projection, to obtain the reconstructed light-field. The method may then end 590.

Examples will be presented below, depicting various ways in which the method may be carried out. The examples presented hereafter will commence with a discussion of reconstruction of the depth data, and then proceed to a discussion of reconstruction of the image data.

Depth Back-Projection

Initially, the case of back-projecting a depth map from single view into a light-field depth map will be presented. For simplicity, rather than looking at a four-dimensional light-field used to project two-dimensional images, a two-dimensional light-field and corresponding one-dimensional images will be presented.

Given a depth value in a single view (such as a center sub-aperture image), that value may be expanded along its epipolar slope to extrapolate depth values to the rest of the light-field. Epipolar slopes and images are described in related U.S. Utility application Ser. No. 14/302,826 for "Depth Determination for Light-Field Images", filed on Jun. 12, 2014 and issued on Mar. 24, 2015 as U.S. Pat. No. 8,988,317, which is incorporated herein by reference. An epipolar image may be an image of a single line across a body of light-field data, which may provide an x,u plot of the data.

Expansion along epipolar slopes may provide depth values at every light-field point, and not just the points at the sub-aperture location. This will be shown and described in connection with FIGS. 6A through 6D.

Figure 6A:
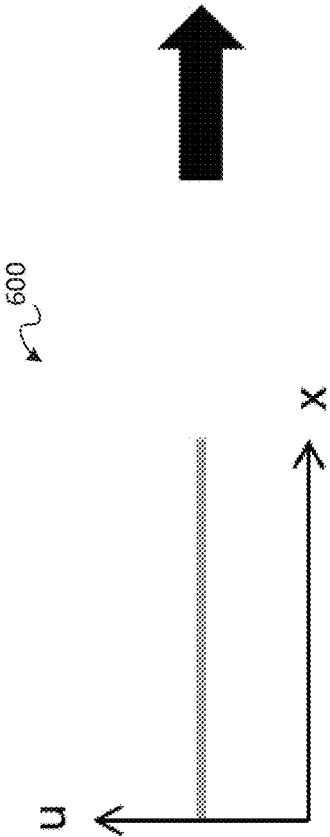
FIGS. 6A and 6B are a one-dimensional image and a two-dimensional light-field, respectively, in which the two-dimensional light-field has been reconstructed from the one-dimensional image with a positive depth value, according to one embodiment.
Figure 6B:
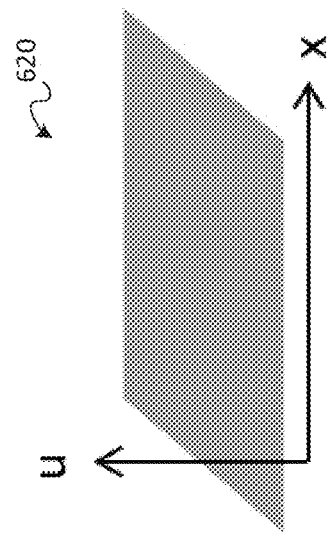
Figure 6C:
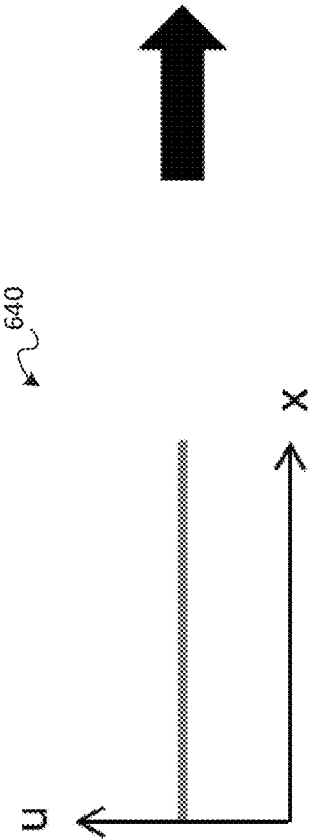
FIGS. 6C and 6D are a one-dimensional image and a two-dimensional light-field, respectively, in which the two-dimensional light-field has been reconstructed from the one-dimensional image with a negative depth value, according to one embodiment.
Figure 6D:
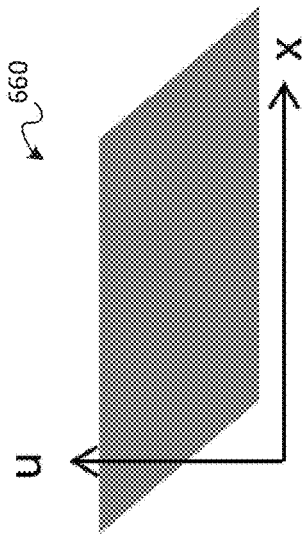

FIGS. 6A and 6B depict a one-dimensional image 600 and a two-dimensional light-field 620, respectively, in which the two-dimensional light-field 620 has been reconstructed from the one-dimensional image 600 with a positive depth value, according to one embodiment. Similarly, FIGS. 6C and 6D depict a one-dimensional image 640 and a two-dimensional light-field 660, respectively, in which the two-dimensional light-field 660 has been reconstructed from the one-dimensional image 640 with a negative depth value, according to one embodiment.

Given a single background object at positive lambda (orange), as in FIG. 6A, the one-dimensional image 600 provides depth at the center sub-aperture. This is represented in the x,u plane of FIG. 6A as the orange line at u=0. The light-field refocusing equations provide that:

$$\Delta x \propto \lambda \Delta u$$

Accordingly, it follows that:

$$dx/du \propto \lambda$$

Accordingly, the depth value can be extrapolated to the rest of the light-field by following the slope given by lambda. The same is true for FIG. 6C, in which a single background object is at negative lambda (blue). Some techniques for expanding values along epipolar slopes include, but are not limited to, resampling and ray height-field tracing, as known in the art.

A problem may arise when foreground and background objects are mixed. This will be described with reference to FIGS. 7A through 7C.

FIGS. 7A through 7C depict a one-dimensional image 700, a two-dimensional light-field 720, and an original light-field 740, respectively, in which the two-dimensional light-field 720 has been reconstructed from the one-dimensional image 700, depicting a foreground object (blue) in front of a larger background object (orange), according to one embodiment. The depth expansion along the epipolar slopes may end up looking like FIG. 7B, assuming that the foreground object occludes the background. As shown, there are significant holes in the back-projected depth map.

The disparities between FIGS. 7B and 7C show the loss of depth information that may occur. Specifically, FIG. 7C depicts how the reconstructed light-field should appear. However, since the information behind the occlusion is missing, holes are present in the back-projection of FIG. 7B. One potential solution is to interpolate in the missing values, which in this case would be filling in the holes with orange. However, this may not necessarily be correct, since it is not known, from the one-dimensional image 700 of FIG. 7A, whether the occluded values behind the blue object are actually orange. They may have a different depth that does not correspond to that of the orange portion of FIG. 7B. For example, the holes may more appropriately be represented by a color that is neither orange nor blue.

Techniques for filling in such holes are known in the art. Additionally or alternatively, more than one view may be used for back-projection to help fill in such holes, as described in the following section, with reference to image back-projection which will be described in greater detail in connection with FIGS. 12 and 13.

Figure 8:
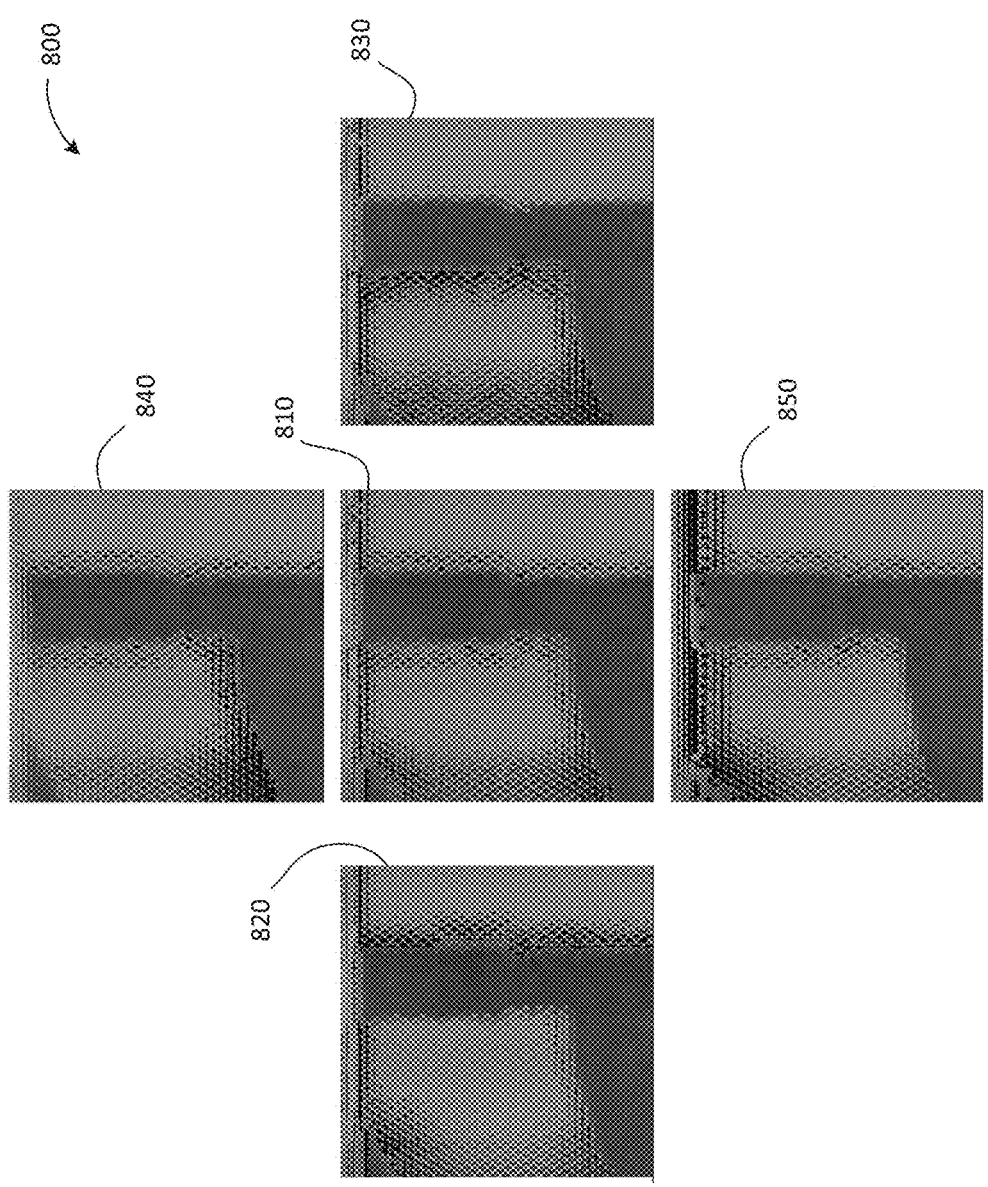
FIG. 8 depicts back-projections of various views, according to one embodiment.

FIG. 8 depicts back-projections of various views, according to one embodiment. Specifically, back-projection of a center sub-aperture 810, a left sub-aperture 820, a right sub-aperture 830, a top sub-aperture 840, and a bottom sub-aperture 850 are depicted. Each of these sub-aperture views may contain holes (black) due to occlusion. These holes align differently depending on the position of the sub-aperture. Accordingly, information from these different sub-aperture views may be combined to fill in holes in the back-projection, as will be described below.

Multi-View Back-Projection

As mentioned above, one possible solution to the problem of holes in the back-projection is to employ more views. This may provide the ability to "look around" the occlusion and propagate the discovered values into the reconstructed light-field. For example, the light-field depth map of FIG. 7C may be used, but rather than using a single sub-aperture view, three views may be acquired. This will be shown and described in connection with FIG. 9.

Figure 9:
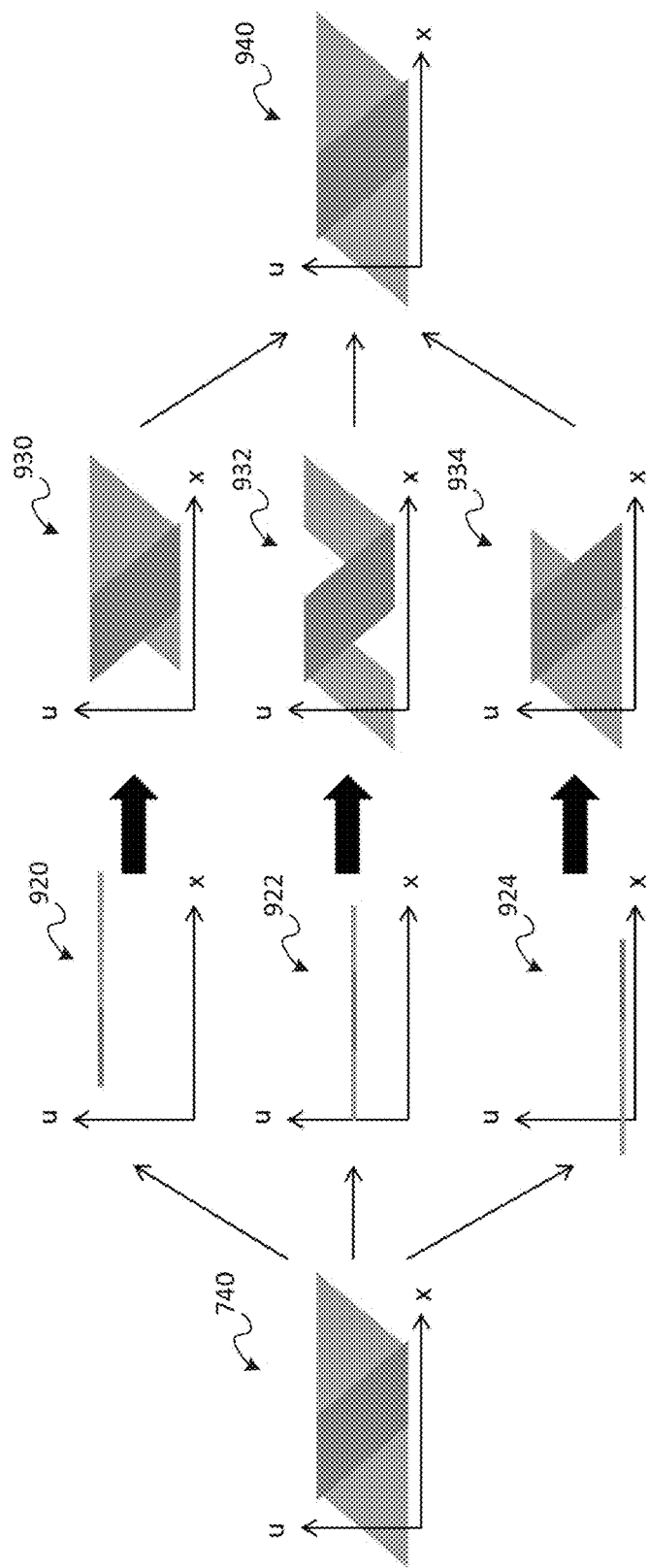
FIG. 9 depicts the use of three one-dimensional sub-aperture views of the original light-field of FIG. 7C, according to one embodiment.

FIG. 9 depicts the use of three one-dimensional sub-aperture views of the original light-field 740 of FIG. 7C, according to one embodiment. In addition to a center sub-aperture 922, a left sub-aperture 920 and a right sub-aperture 924 may also be used. Each of the center sub-aperture 922, the left sub-aperture 920 and the right sub-aperture 924 sub-aperture may be a one-dimensional slice of the two-dimensional, original light-field 740. Each of these one-dimensional slices may be expanded to extrapolate information from original light-field 740. In alternative embodiments, more or fewer sub-aperture views may be used.

For each of the center sub-aperture 922, the left sub-aperture 920 and the right sub-aperture 924, the same process of expanding the depth values along the epipolar slope may be applied, resulting in three back-projected depth maps. Specifically, FIG. 9 depicts a center depth map 932 back-projected from the center sub-aperture 922, a left depth map 930 back-projected from the left sub-aperture 920, and a right depth map 934 back-projected from the right sub-aperture 924. The center depth map 932, the left depth map 930, and the right depth map 934 may each have holes, but the holes are in different places for each depth map. Thus, the center depth map 932, the left depth map 930, and the right depth map 934 may be combined into a single one, yielding a reconstructed light-field 940 that is not missing depth data.

This combination may be carried out in various ways. According to one example, weighted averages may be used to combine the center depth map 932, the left depth map 930, and the right depth map 934. In any case, the result may be that a sparse light-field, such as a subset of sub-aperture views, can be extrapolated to a dense light-field by utilizing the constraints imposed by known depth maps. This may facilitate the reconstruction of a light-field of higher angular resolution from a light-field captured at lower resolution, a light-field compressed and represented through the use of a limited number of sub-aperture views, and/or the like.

Figure 10:
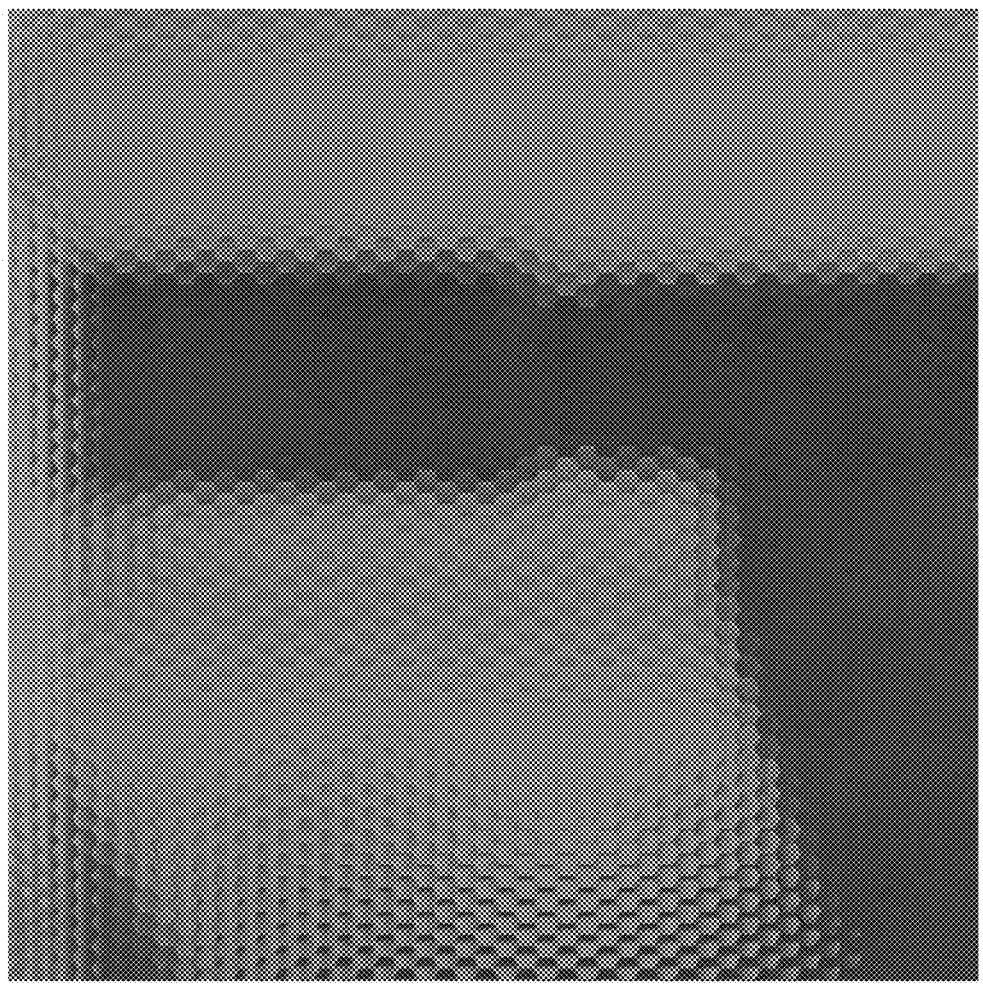
FIG. 10 depicts a merged back-projected light-field, which may be obtained via combination of the center sub-aperture, the left sub-aperture, the right sub-aperture, the top sub-aperture, and the bottom sub-aperture of FIG. 8, according to one embodiment.

FIG. 10 depicts a merged back-projected light-field 1000, which may be obtained via combination of the center sub-aperture 810, the left sub-aperture 820, the right sub-aperture 830, the top sub-aperture 840, and the bottom sub-aperture 850 of FIG. 8, according to one embodiment. Combination of these views has enabled occlusions to be filled in the back-projected light-field 1000.

Keyhole Problem

In some cases of occlusion, the use of a pre-defined set of additional sub-aperture views may not be sufficient to fill in the holes in the reconstructed light-field. For example, in a "keyhole" problem, a background object is only visible through a small hole in the foreground object. Because the hole is so small, the left and right sub-aperture views may only partially look around the occlusion. Combining the back-projected depths may still result in holes, although the holes may be smaller.

Figure 11:
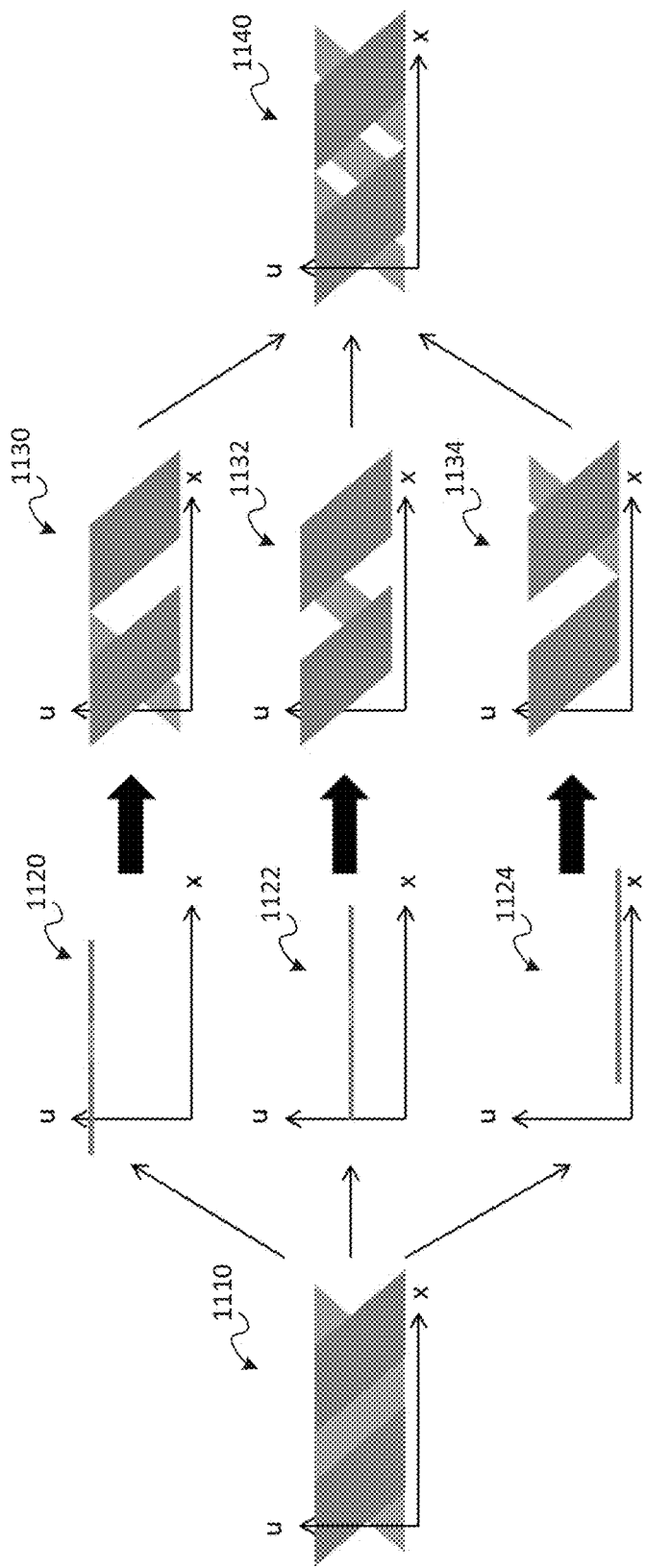
FIG. 11 depicts the use of three one-dimensional sub-aperture views of an original light-field, according to one embodiment.

FIG. 11 depicts the use of three one-dimensional sub-aperture views of an original light-field 1110, according to one embodiment. In addition to a center sub-aperture 1122, a left sub-aperture 1120 and a right sub-aperture 1124 may also be used, as in FIG. 9. A center depth map 1132 may be back-projected from the center sub-aperture 1122, a left depth map 1130 may be back-projected from the left sub-aperture 1120, and a right depth map 1134 may be back-projected from the right sub-aperture 1124.

The center depth map 1132, the left depth map 1130, and the right depth map 1134 may each have holes; these holes may be in different places for each depth map. Unfortunately, the geometry of the occlusions may cause holes to be present in the reconstructed light-field 1140 generated from the combination of the center depth map 1132, the left depth map 1130, and the right depth map 1134.

This problem may be solved in various ways. According to some embodiments, the remaining holes may be filled by adding additional views, or by interpolating the existing information. Some reconstruction methods may employ iterative processes by which reconstruction is initially carried out with a limited number of sub-aperture views, and then new sub-aperture views are added as needed to enable such holes to be filled in.

Image Back-Projection

In the above examples, the depth values themselves were back-projected into a light-field. However, the systems and methods of the present disclosure are not limited to back-projection of depth values. Rather, any values can be back-projected, including image values. As described above in connection with depth values, the image values may be expanded along epipolar slopes. In cases in which image data is back-projected from sub-aperture views the result may be the creation of a dense light-field from a sparse light-field. There are many ways to accomplish this. Two ways will be described herein: per-view back-projection and depth-first back-projection.

Per View Back-Projection

Figure 12:
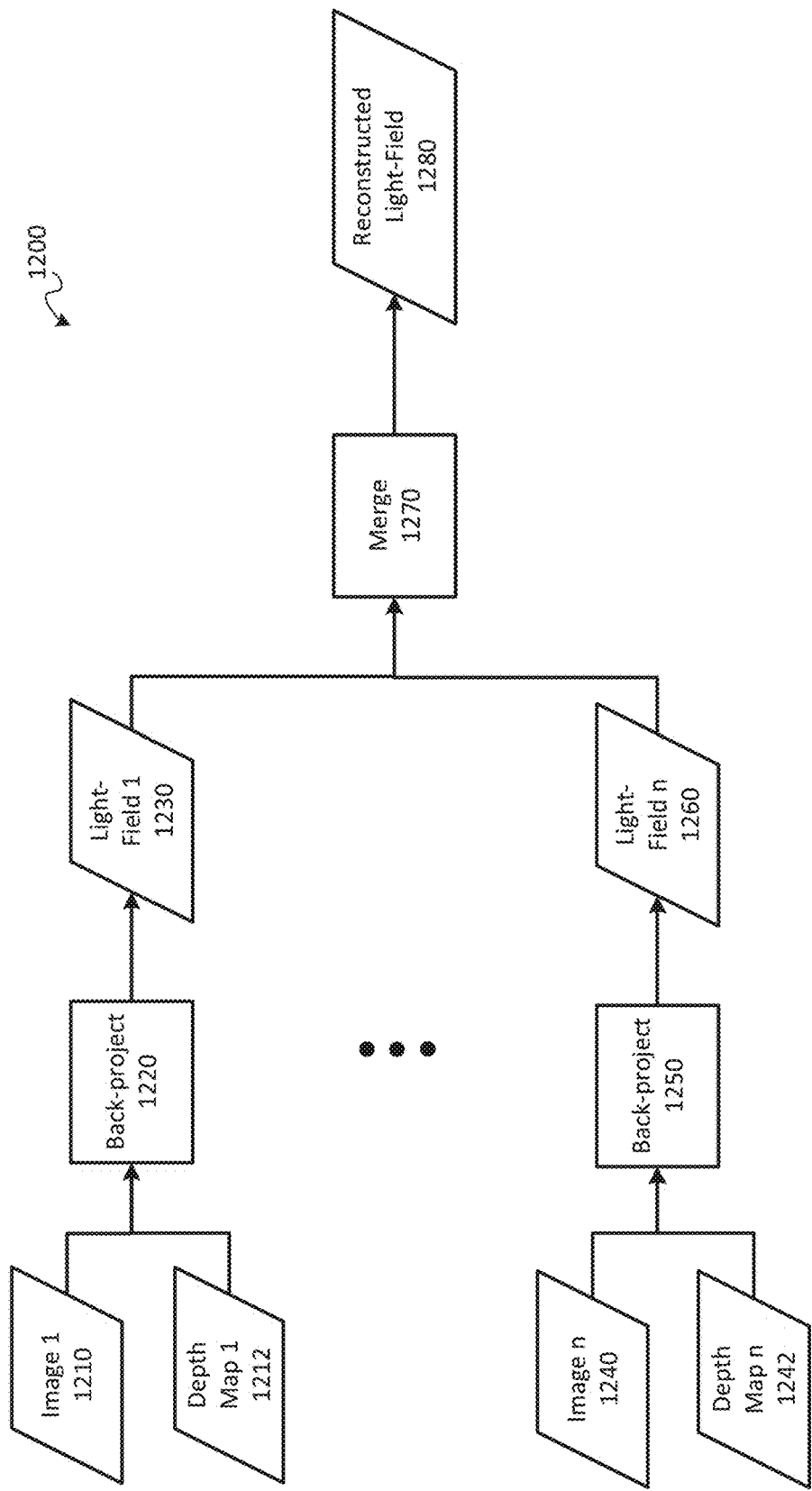
FIG. 12 is a process flow diagram depicting per-view back-projection, according to one embodiment.

FIG. 12 is a process flow diagram 1200 depicting per-view back-projection, according to one embodiment. In the case where the sub-aperture images have co-aligned depth maps, each view can be back-projected independently, and then the resulting back-projected light-fields can be combined together, for example via weighted averaging.

Thus, in FIG. 12, a view represented by a first image 1210 and a first depth map 1212 corresponding to the first image 1210 may be back-projected 1220 to generate a first light-field 1230. The same process may be carried out for one or more other views, up to an nth image 1240 and an nth depth map 1242 corresponding to the nth image 1240, which may be back-projected 1250 to generate an nth light-field 1260. The first light-field 1230 through the nth light-field 1260 may be merged 1270 together, for example via averaging or weighted averaging, to generate the reconstructed light-field 1280.

In the most straightforward case, the image values may be back-projected directly from the sub-aperture image (for example, the first image 1210 through the nth image 1240) given its corresponding depth map (the first depth map 1212 through the nth depth map 1242). In the alternative, the depth map may be back-projected first; the back-projected depth value may then be used to back-project the image value. This alternative method may be less straightforward in implementation, but may allow for more flexibility. In particular, back-projecting values using an already back-projected depth map may not require epipolar slope expansion.

For back-projecting values after depth back-projection, a depth value λ for each light-field point (x, y, u, v) may be easily obtained. For a given sub-aperture at location (u', v'), that light-field coordinate would project to x'=x−λ(u−u') and y'=y−λ(v−v'). The normalization factor has been ignored here. The sub-aperture image may simply be sampled at (x', y') to obtain the light-field value at (x, y, u, v). In the case of occlusion, no λ may exist, and the ray may correctly receive no information from this view.

One exemplary algorithm for carrying out per-view back-projection is as follows:

```
Input: views, lightfieldCoordinates
numViews = views.size( )
for i = 0 to numViews − 1:
    backprojection[i] = BackProjectView(view[i], lightfieldCoordinates)
endfor
totalWeight = 0
for i = 0 to numViews − 1:
    (u, v) = view[i].coord( )
    weight = Weight(u, v, lightfieldCoordinates)
    backprojection += backprojection[i]*weight
    totalWeight += weight
endfor
backprojection /= totalWeight
end
// This implementation uses heightfield ray tracing
BackProjectView(view, lightfieldCoordinates):
    backprojection = AllocateBuffer(lightfieldCoordinates)
    for (x, y, u, v) in lightfieldCoordinates:
        lambda = RayTraceHeightField(view.depth, x, y, u, v)
        if lambda:
            (x', y') = ProjectRay(x, y, u, v, view.coord( ), lambda)
            backprojection[x, y, u, v] = view.image.Sample(x', y')
        end for
    return backprojection
end
```

Per-view back-projection may have some noteworthy advantages. The primary advantage of this approach may be simplicity. In particular, occlusion may be (mostly) automatically handled. A secondary advantage is flexibility, since not all views have to be processed to generate a back-projected light-field. In one use case, a minimal number of views may be back-projected, and if occlusions still exist (i.e. due to the keyhole problem), additional views may be back-projected without having to reprocess the original views. If memory efficiency is desired, the back-projected depth map may not need to be generated if back-projection is carried out directly from the sub-aperture images without back-projecting the depth map first.

Depth-First Back-Projection

Figure 13:
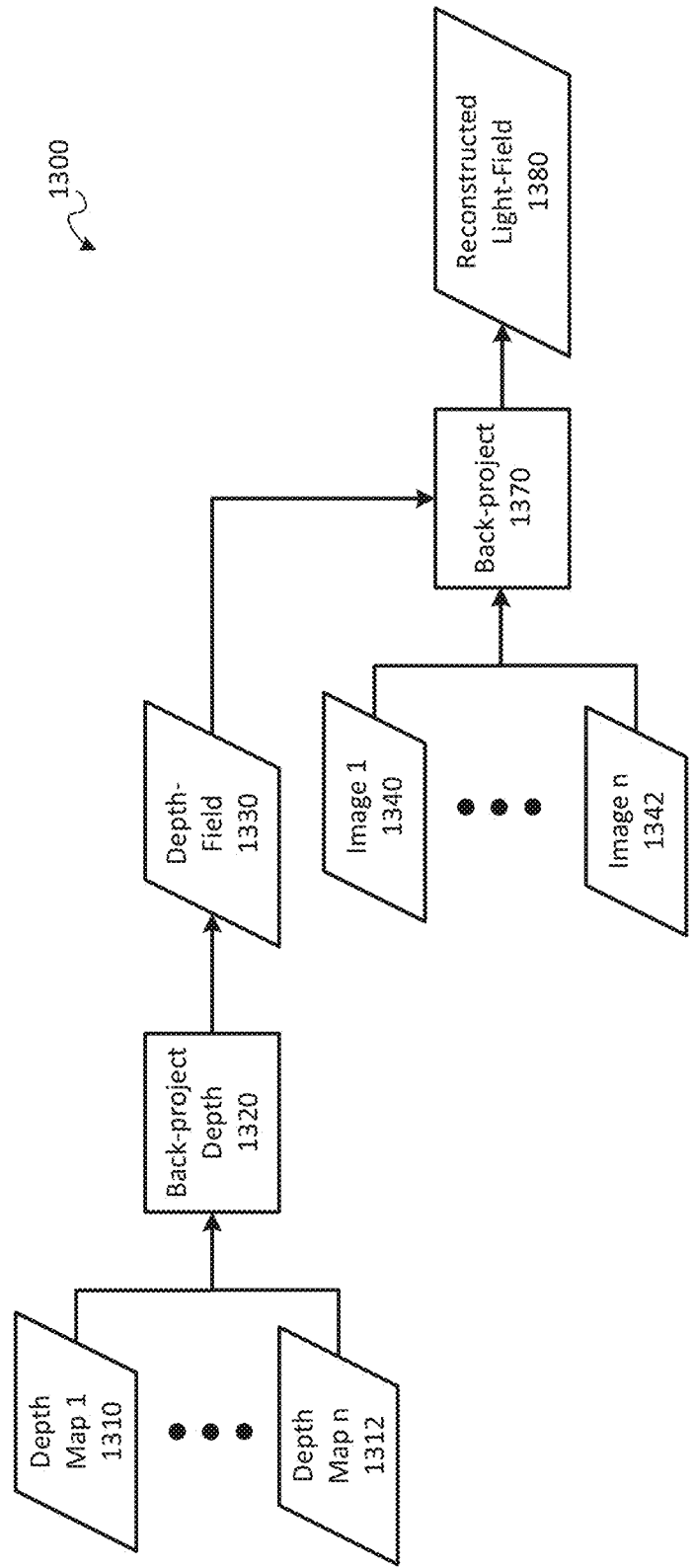
FIG. 13 is a process flow diagram depicting depth-first back-projection, according to one embodiment.

FIG. 13 is a process flow diagram 1300 depicting depth-first back-projection, according to one embodiment. In this approach, the depth maps may be back-projected first and then combined into a single depth light-field (a "depth-field"). Thus, in FIG. 13, a plurality of depth maps, from a first depth map 1310 to an nth depth map 1312, are back-projected 1320 to generate a depth-field 1330.

Once the depth-field 1330 has been created, each view, for example, each of a plurality of images, from a first image 1340 to an nth image 1342, may be back-projected 1370 using the depth-field 1330. The resulting back-projections may be combined to generate the reconstructed light-field 1380. Through the aid of the present disclosure, a person of skill in the art will recognize how the exemplary algorithm for per-view back-projection may be modified to carry out depth-first back-projection.

During the back-projection of the images, care must be taken to handle occlusion. The depth-field 1330 will likely be fully populated, but this does not mean that a view will contain information for every ray.

Depth-first back-projection may also have a number of advantages. The principal advantage may be that the depth maps (the first depth map 1310 through the nth depth map 1312) need not necessarily be co-aligned with the sub-aperture images (the first image 1340 through the nth image 1342). A second advantage is that because the back-projected depth maps are combined first, additional processing can be used to improve the depth accuracy. Such additional processing can lead to more accurate depth values used during image back-projection.

Per-view back-projection and depth-first back-projection may both utilize the extrapolation methods set forth previously. Thus, a mosaic of images and/or depth maps may be used to generate the reconstructed light-field. This process is not limited to the one-dimensional sub-aperture images and two-dimensional light-fields provided in the preceding examples. Rather, such back-projection processes may be applied to two-dimensional sub-aperture images and depth maps, and may be used to reconstruct a four-dimensional (x,y,u,v) light-field.

Figure 14:
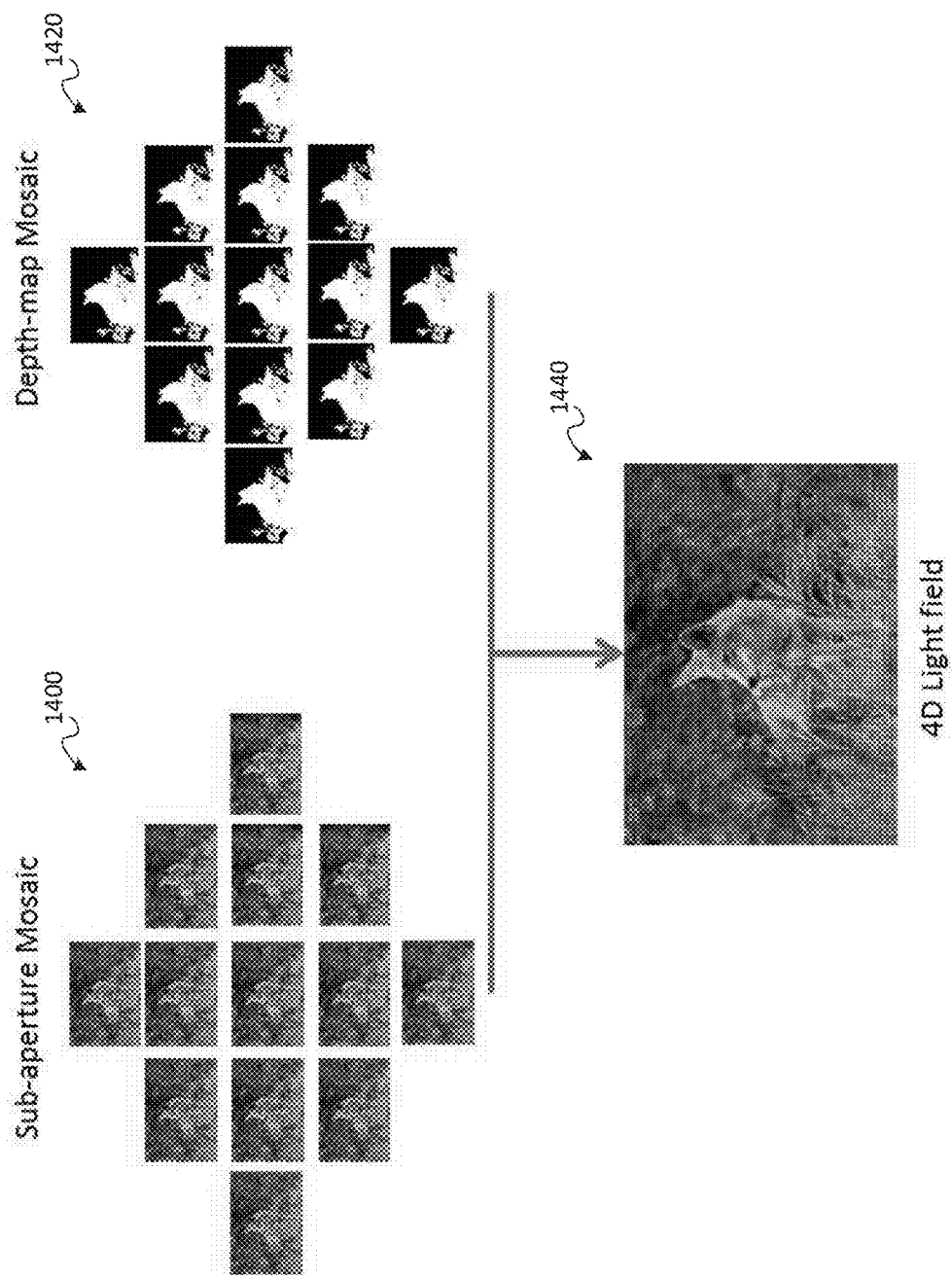
FIG. 14 depicts the use of mosaics of images and depth maps to reconstruct a four-dimensional light-field, according to one embodiment.

FIG. 14 depicts the use of mosaics of images and depth maps to reconstruct a four-dimensional light-field, according to one embodiment. A mosaic 1400 of two-dimensional sub-aperture images and a mosaic 1420 of two-dimensional depth maps may be used as the inputs for a back-projection process, such as the depth-first back-projection process discussed previously. The result may be the generation of a four-dimensional reconstructed light-field 1440.

Back-Projection of Computer-Generated Image Data to Light-Field

In at least one embodiment, computer-generated imagery may be back-projected to reconstruct a light-field. According to one example, a first step is to render a number of views of the computer-generated scene. Since the rendering quality for such scenes is generally high and the depth information is often exact, it may not be necessary to back-project more than a subset of views. In at least one embodiment, in order to avoid aliasing artifacts, the views may be rendered at high resolution.

Figure 15:
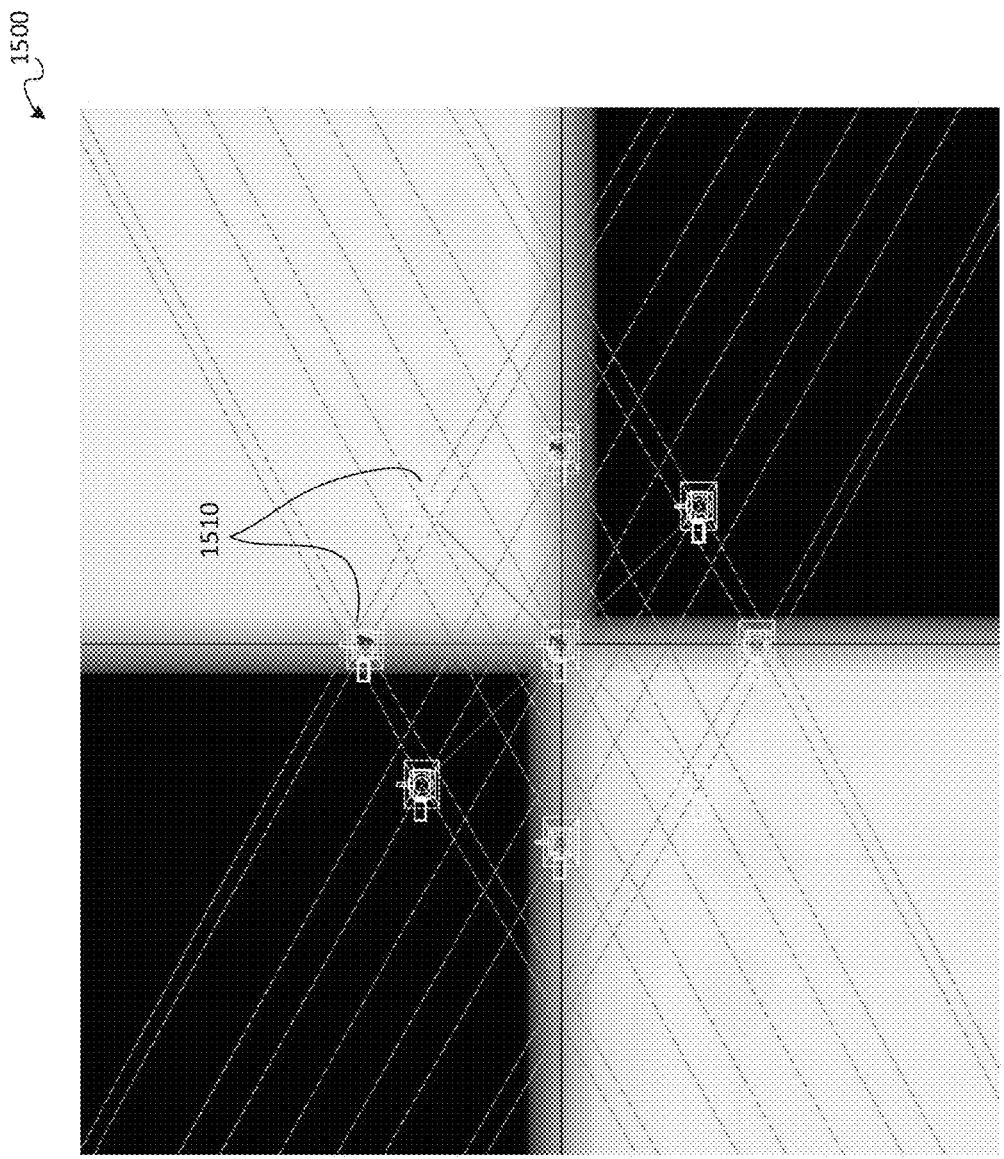
FIG. 15 is an image depicting an exemplary arrangement of cameras in a circular format, as in a nine-camera rig, according to one embodiment.

FIG. 15 depicts an example of an arrangement 1500 for back-projection of views captured by a nine-camera rig. Cameras 1510 are arranged in a circular format, as in a nine-camera rig, according to one embodiment. To achieve the proper convergence at the focal point (zero parallax), the lenses of the cameras 1510 may be shifted by a specific offset determined by the optics of the cameras 1510. The magnitude of the offset may be directly proportional to the exit pupil baseline of the light-field. The magnitude of the shift may be calculated so that parallax vanishes at a convergence point aligned with the focus plane. The disparity (in pixels) at the minimum and maximum refocusing distances may match the micro-lens diameter in pixels, as shown in FIGS. 16A and 16B.

Figure 16B:
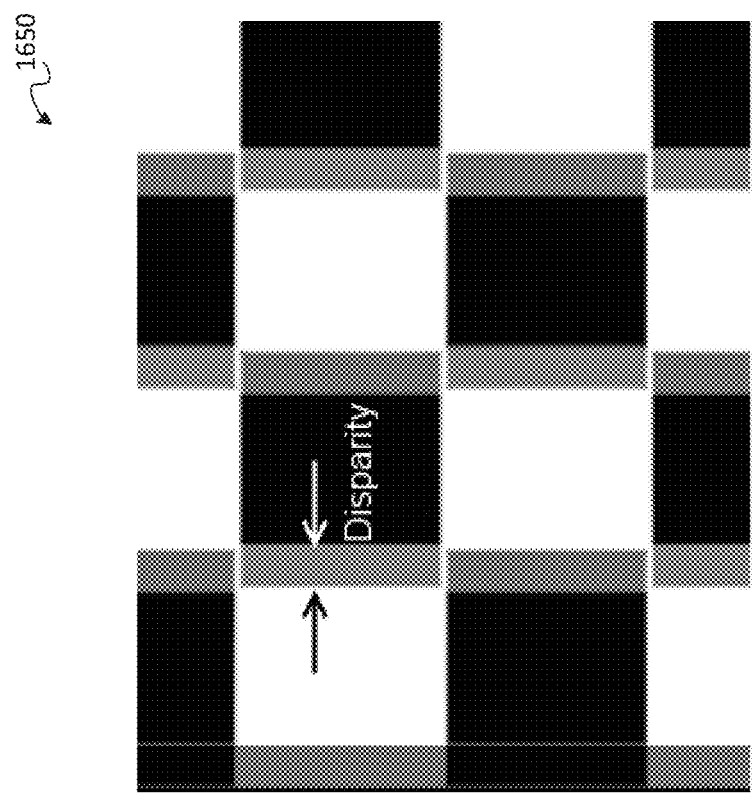
FIGS. 16A and 16B are images depicting disparity, in pixels, at minimum and maximum lambda, respectively, according to one embodiment.
Figure 16A:
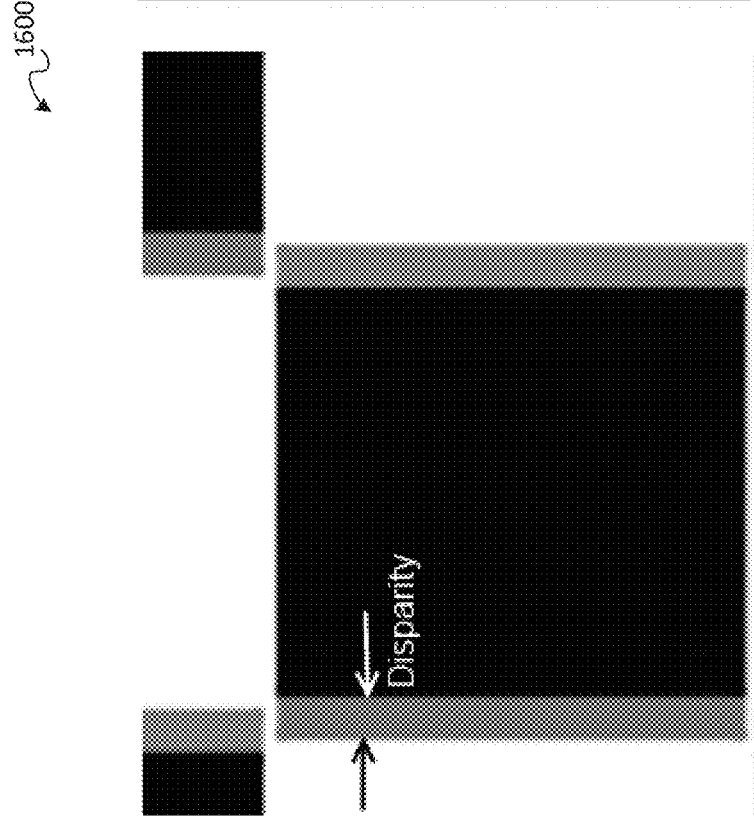

Referring to FIGS. 16A and 16B, an image 1600 and an image 1650 depict the disparity, in pixels (gray region), at minimum and maximum lambda, respectively, according to one embodiment. Minimum and maximum lambda may represent the refocus distance limits when projecting a checkerboard target, as shown. These refocus limits can be calculated analytically for a given light-field capture setup.

Figure 17:
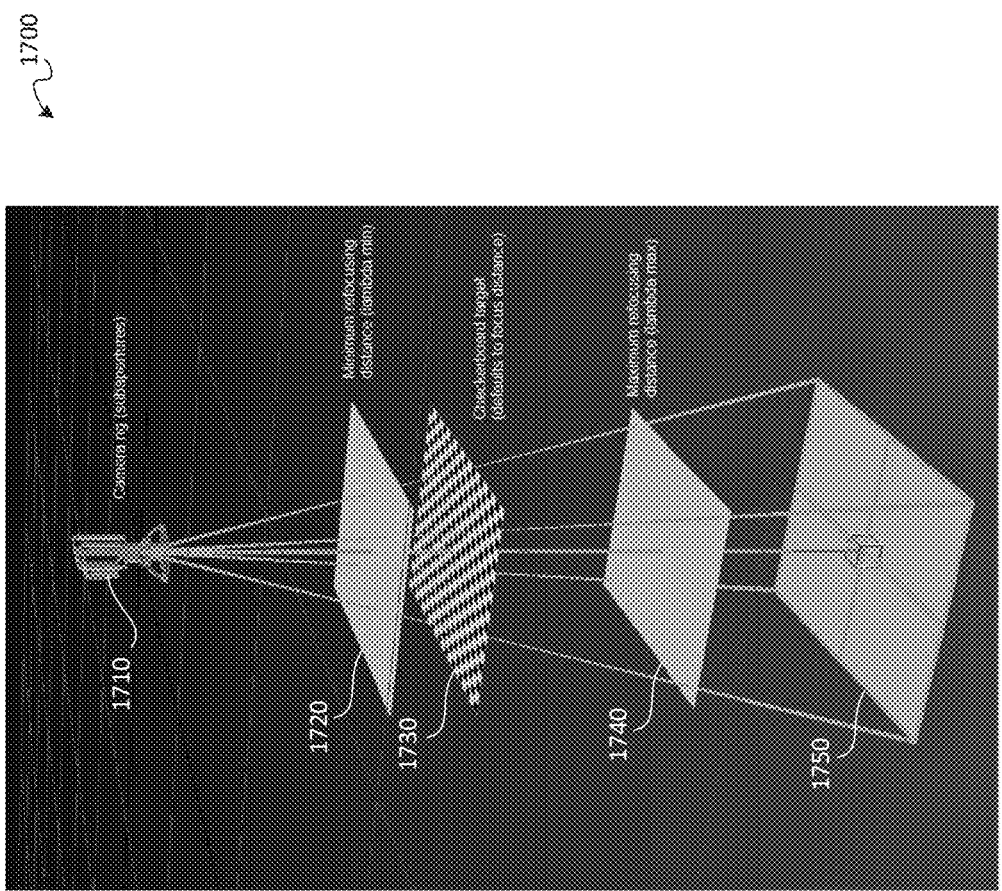
FIG. 17 is an image depicting the relative positions of the camera rig, the minimum lambda, the checkerboard target, the maximum lambda, and a computer-generated scene, according to one embodiment.

Referring to FIG. 17, an image 1700 depicts the relative positions of the camera rig 1710, the minimum lambda 1720, the checkerboard target 1730, the maximum lambda 1740, and a computer-generated scene 1750, according to one embodiment. The computer-generated scene 1750 may advantageously match up with the physical layout of the captured light-field. Rendering a view may require color (for example, RGB) and depth data for the specific view to be rendered. In addition to the RGB data, alpha and/or other data may also be back-projected to the light-field. To improve back-projection quality, the render output may advantageously be higher resolution than the native sub-aperture views of the camera rig 1710.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for generating a reconstructed light-field, the method comprising:
from a storage device, retrieving a first image depicting a light-field from a first viewpoint;
in a processor, obtaining a first value of interest pertinent to the first image; and
in the processor, using the first value of interest to generate the reconstructed light-field by extrapolating corresponding values, corresponding to the first value of interest, for a first plurality of other images;
wherein:
the first plurality of other images comprises at least a second image depicting the light-field from a second viewpoint, and a third image depicting the light-field from a third viewpoint; and
using the first value of interest to extrapolate the corresponding values comprises:
based on relative positions of the first viewpoint and the second viewpoint, extrapolating a second value of interest pertinent to the second image; and
based on relative positions of the first viewpoint and the third viewpoint, extrapolating a third value of interest pertinent to the third image,
wherein:
the second viewpoint is displaced from the first viewpoint along a second direction; and
the third viewpoint is displaced form the first viewpoint along a third direction opposite to the second direction,
wherein:
using the first value of interest to generate the reconstructed light-field further comprises extrapolating corresponding values, corresponding to the first value of interest, for a second plurality of other images;
the second plurality of other images comprises at least a fourth image depicting the light-field from a fourth viewpoint, and a fifth image depicting the light-field from a fifth viewpoint;
the fourth viewpoint is displaced from the first viewpoint along a fourth direction perpendicular to the second direction and the third direction;
the fifth viewpoint is displaced from the first viewpoint along a fifth direction opposite to the fourth direction; and
using the first value of interest to extrapolate the corresponding values comprises:
based on relative positions of the first viewpoint and the fourth viewpoint, extrapolating a fourth value of interest pertinent to the fourth image; and
based on relative positions of the first viewpoint and the fifth viewpoint, extrapolating a fifth value of interest pertinent to the fifth image.

2. The method of claim 1, wherein the first value of interest comprises a depth of at least one object depicted in the first image.

3. The method of claim 2, wherein:
extrapolating the corresponding values, for the first plurality of other images comprises:
back-projecting a second depth map for the second image; and
back-projecting a third depth map for the third image; and
the method further comprises using weighted averages of at least the second depth map and the third depth map to generate a reconstructed depth-field for objects within the reconstructed light-field.

4. The method of claim 1, wherein the first value of interest comprises an image value of at least one portion of the first image.

5. The method of claim 4, wherein extrapolating the corresponding values, for the first plurality of other images comprises:
back-projecting a second light-field for the second image;
back-projecting a third light-field for the third image; and
using weighted averages of at least the second light-field and the third light-field to generate the reconstructed light-field.

6. The method of claim 4, wherein extrapolating the corresponding values, for the first plurality of other images comprises:
generating a reconstructed depth-field for objects within the reconstructed light-field; and
using the reconstructed depth-field to back-project image values for the reconstructed light-field.

7. The method of claim 1, further comprising, after generation of the reconstructed light-field, using the reconstructed light-field to project a new image from a new viewpoint.

8. The method of claim 1, wherein:
the first image comprises a first sub-aperture image projected from light-field data captured with a light-field camera;
the second image comprises a second sub-aperture image projected from the light-field data; and
the third image comprises a third sub-aperture image projected from the light-field data.

9. The method of claim 1, wherein:
the first image comprises first image data derived from a first sub-aperture image projected from light-field data captured with a light-field camera;
the second image comprises second image data derived from a second sub-aperture image projected from the light-field data; and
the third image comprises third image data derived from a third sub-aperture image projected from the light-field data.

10. The method of claim 1, wherein each of the first image, the second image, and the third image consists exclusively of data generated without involving capture of image data by a camera.

11. The method of claim 1, wherein each of the first image, the second image, and the third image comprises a conventional image captured with a camera that is not a light-field camera.

12. A non-transitory computer-readable medium for generating a reconstructed light-field, the non-transitory computer-readable medium comprising instructions stored thereon, that when executed by a processor, perform the steps of:
causing a storage device to retrieve a first image depicting a light-field from a first viewpoint;
obtaining a first value of interest pertinent to the first image; and
using the first value of interest to generate the reconstructed light-field by extrapolating corresponding values, corresponding to the first value of interest, for a first plurality of other images;
wherein:
the first plurality of other images comprises at least a second image depicting the light-field from a second viewpoint, and a third image depicting the light-field from a third viewpoint; and
using the first value of interest to extrapolate the corresponding values comprises:
based on relative positions of the first viewpoint and the second viewpoint, extrapolating a second value of interest pertinent to the second image; and
based on relative positions of the first viewpoint and the third viewpoint, extrapolating a third value of interest pertinent to the third image,
wherein:
the second viewpoint is displaced from the first viewpoint along a second direction;
the third viewpoint is displaced form the first viewpoint along a third direction opposite to the second direction;
using the first value of interest to generate the reconstructed light-field further comprises extrapolating corresponding values, corresponding to the first value of interest, for a second plurality of other images;
the second plurality of other images comprises at least a fourth image depicting the light-field from a fourth viewpoint, and a fifth image depicting the light-field from a fifth viewpoint;
the fourth viewpoint is displaced from the first viewpoint along a fourth direction perpendicular to the second direction and the third direction;
the fifth viewpoint is displaced from the first viewpoint along a fifth direction opposite to the fourth direction; and
using the first value of interest to extrapolate the corresponding values comprises:
based on relative positions of the first viewpoint and the fourth viewpoint, extrapolating a fourth value of interest pertinent to the fourth image; and
based on relative positions of the first viewpoint and the fifth viewpoint, extrapolating a fifth value of interest pertinent to the fifth image.

13. The non-transitory computer-readable medium of claim 12, wherein:
the first value of interest comprises a depth of at least one object depicted in the first image;
extrapolating the corresponding values, for the first plurality of other images comprises:
back-projecting a second depth map for the second image; and
back-projecting a third depth map for the third image; and
the non-transitory computer-readable medium further comprises instructions stored thereon, that when executed by a processor, use weighted averages of at least the second depth map and the third depth map to generate a reconstructed depth-field for objects within the reconstructed light-field.

14. The non-transitory computer-readable medium of claim 12, wherein:
the first value of interest comprises an image value of at least one portion of the first image; and
extrapolating the corresponding values, for the first plurality of other images comprises:
back-projecting a second light-field for the second image;
back-projecting a third light-field for the third image; and
using weighted averages of at least the second light-field and the third light-field to generate the reconstructed light-field.

15. The non-transitory computer-readable medium of claim 12, wherein:
the first value of interest comprises an image value of at least one portion of the first image; and
extrapolating the corresponding values, for the first plurality of other images comprises:
generating a reconstructed depth-field for objects within the reconstructed light-field; and
using the reconstructed depth-field to back-project image values for the reconstructed light-field.

16. The non-transitory computer-readable medium of claim 12, further comprising instructions stored thereon, that when executed by a processor, after generation of the reconstructed light-field, use the reconstructed light-field to project a new image from a new viewpoint.

17. The non-transitory computer-readable medium of claim 12, wherein:
the first image comprises a first sub-aperture image projected from light-field data captured with a light-field camera;
the second image comprises a second sub-aperture image projected from the light-field data; and
the third image comprises a third sub-aperture image projected from the light-field data.

18. The non-transitory computer-readable medium of claim 12, wherein:
the first image comprises first image data derived from a first sub-aperture image projected from light-field data captured with a light-field camera;
the second image comprises second image data derived from a second sub-aperture image projected from the light-field data; and
the third image comprises third image data derived from a third sub-aperture image projected from the light-field data.

19. The non-transitory computer-readable medium of claim 12, wherein each of the first image, the second image, and the third image consists exclusively of data generated without involving capture of image data by a camera.

20. The non-transitory computer-readable medium of claim 12, wherein each of the first image, the second image, and the third image comprises a conventional image captured with a camera that is not a light-field camera.

21. A system for generating a reconstructed light-field, the system comprising:
a storage device configured to retrieve a first image depicting a light-field from a first viewpoint; and
a processor, communicatively coupled to the storage device, configured to:
  obtain a first value of interest pertinent to the first image; and
  use the first value of interest to generate the reconstructed light-field by extrapolating corresponding values, corresponding to the first value of interest, for a first plurality of other images;
wherein:
the first plurality of other images comprises at least a second image depicting the light-field from a second viewpoint, and a third image depicting the light-field from a third viewpoint; and
the processor is further configured to use the first value of interest to extrapolate the corresponding values by:
  based on relative positions of the first viewpoint and the second viewpoint, extrapolating a second value of interest pertinent to the second image; and
  based on relative positions of the first viewpoint and the third viewpoint, extrapolating a third value of interest pertinent to the third image,
wherein:
the second viewpoint is displaced from the first viewpoint along a second direction,
the third viewpoint is displaced form the first viewpoint along a third direction opposite to the second direction;
using the first value of interest to generate the reconstructed light-field further comprises extrapolating corresponding values, corresponding to the first value of interest, for a second plurality of other images;
the second plurality of other images comprises at least a fourth image depicting the light-field from a fourth viewpoint, and a fifth image depicting the light-field from a fifth viewpoint;
the fourth viewpoint is displaced from the first viewpoint along a fourth direction perpendicular to the second direction and the third direction;
the fifth viewpoint is displaced from the first viewpoint along a fifth direction opposite to the fourth direction; and
using the first value of interest to extrapolate the corresponding values comprises:
  based on relative positions of the first viewpoint and the fourth viewpoint, extrapolating a fourth value of interest pertinent to the fourth image; and
  based on relative positions of the first viewpoint and the fifth viewpoint, extrapolating a fifth value of interest pertinent to the fifth image.

22. The system of claim 21, wherein:
the first value of interest comprises a depth of at least one object depicted in the first image;
extrapolating the corresponding values, for the first plurality of other images comprises:
  back-projecting a second depth map for the second image; and
  back-projecting a third depth map for the third image; and
the processor is further configured to use weighted averages of at least the second depth map and the third depth map to generate a reconstructed depth-field for objects within the reconstructed light-field.

23. The system of claim 21, wherein:
the first value of interest comprises an image value of at least one portion of the first image; and
extrapolating the corresponding values, for the first plurality of other images comprises:
  back-projecting a second light-field for the second image;
  back-projecting a third light-field for the third image; and
  using weighted averages of at least the second light-field and the third light-field to generate the reconstructed light-field.

24. The system of claim 21, wherein:
the first value of interest comprises an image value of at least one portion of the first image; and
extrapolating the corresponding values, for the first plurality of other images comprises:
  generating a reconstructed depth-field for objects within the reconstructed light-field; and
  using the reconstructed depth-field to back-project image values for the reconstructed light-field.

25. The system of claim 21, wherein the processor is further configured to, after generation of the reconstructed light-field, use the reconstructed light-field to project a new image from a new viewpoint.

26. The system of claim 21, wherein:
the first image comprises a first sub-aperture image projected from light-field data captured with a light-field camera;
the second image comprises a second sub-aperture image projected from the light-field data; and
the third image comprises a third sub-aperture image projected from the light-field data.

27. The system of claim 21, wherein:
the first image comprises first image data derived from a first sub-aperture image projected from light-field data captured with a light-field camera;
the second image comprises second image data derived from a second sub-aperture image projected from the light-field data; and
the third image comprises third image data derived from a third sub-aperture image projected from the light-field data.

28. The system of claim 21, wherein each of the first image, the second image, and the third image consists exclusively of data generated without involving capture of image data by a camera.

29. The system of claim 21, wherein each of the first image, the second image, and the third image comprises a conventional image captured with a camera that is not a light-field camera.

* * * * *